Sept. 1, 1964  C. O. HUFFMAN ETAL  3,146,926
GLASS CUTTING APPARATUS
Filed Oct. 23, 1958  13 Sheets-Sheet 1

INVENTORS
CHARLES O. HUFFMAN
GEORGE W. MISSON and
WILLIAM F. GALEY
BY
Oscar L. Spencer
ATTORNEY

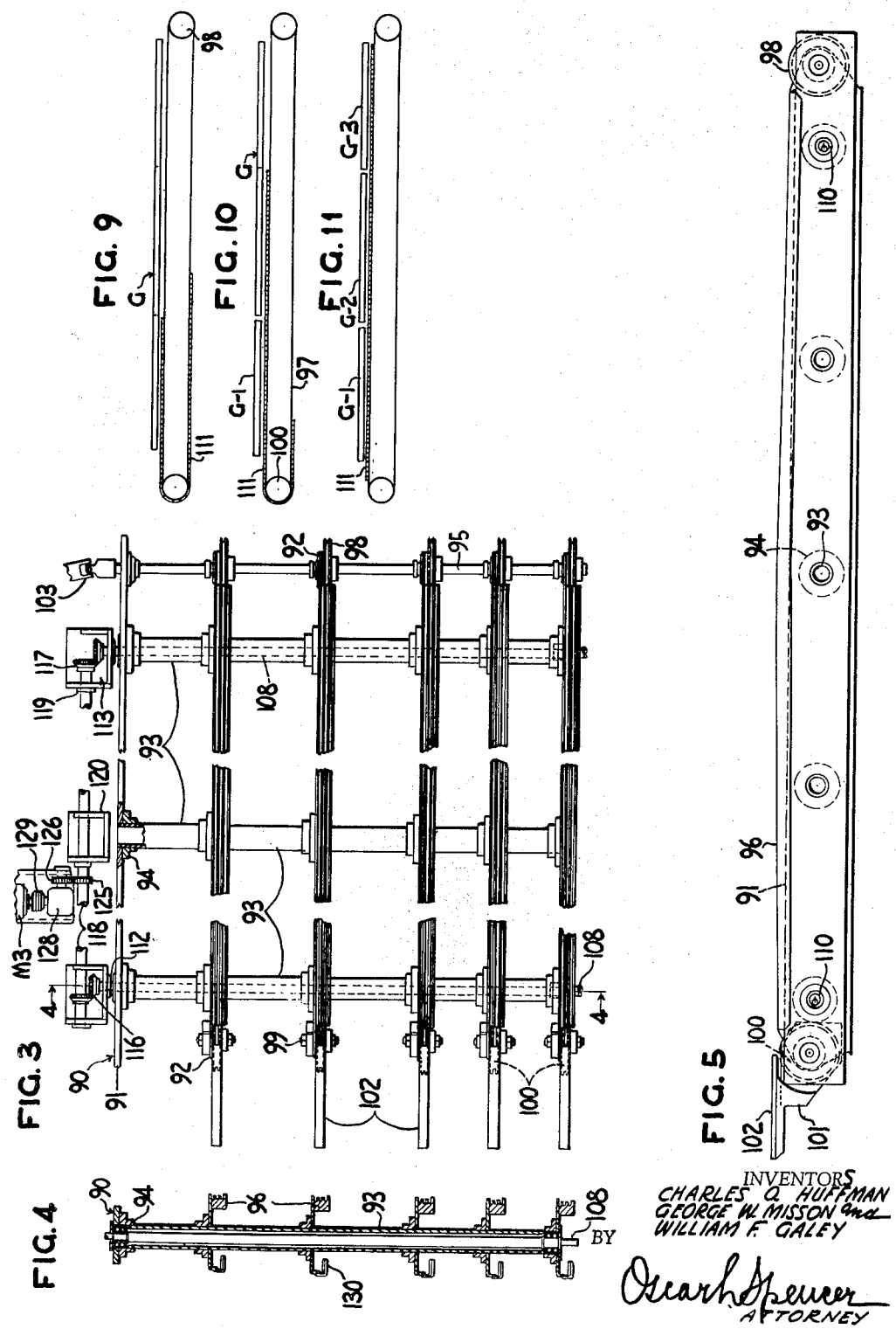

Sept. 1, 1964
C. O. HUFFMAN ETAL
3,146,926
GLASS CUTTING APPARATUS
Filed Oct. 23, 1958
13 Sheets-Sheet 3
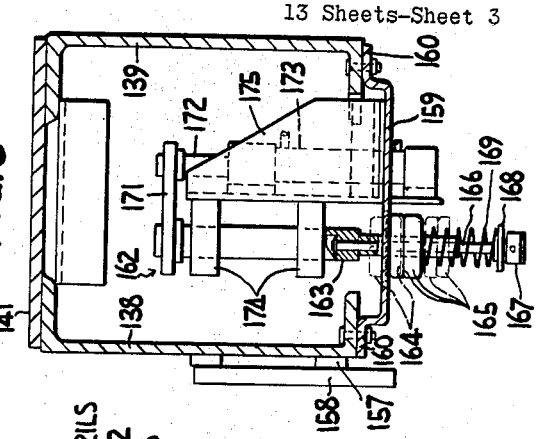
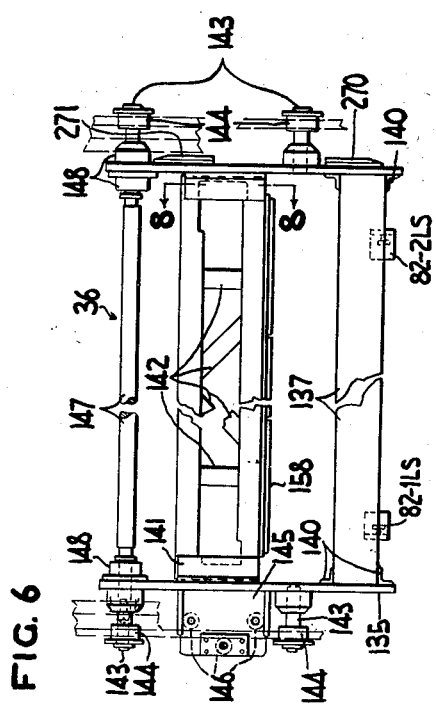
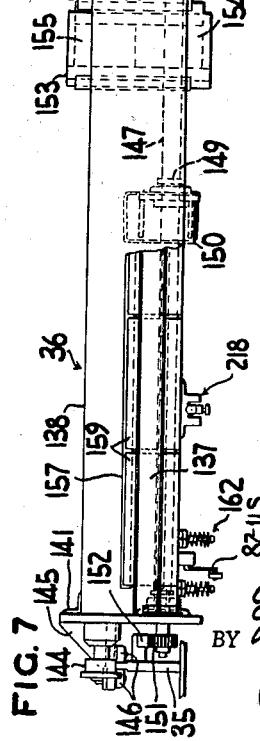
INVENTORS
CHARLES O. HUFFMAN
GEORGE W. MISSON and
BY WILLIAM F. GALEY
Oscar L. Spencer
ATTORNEY

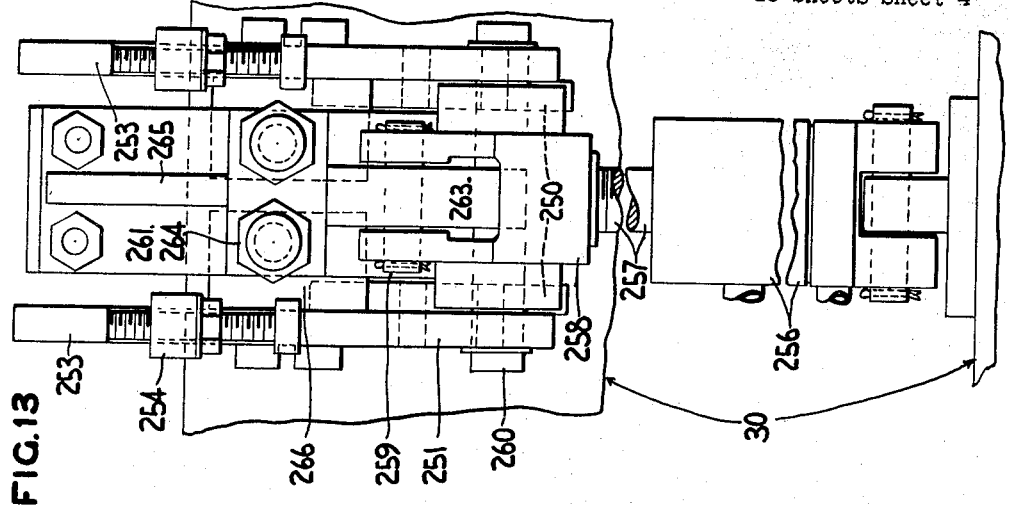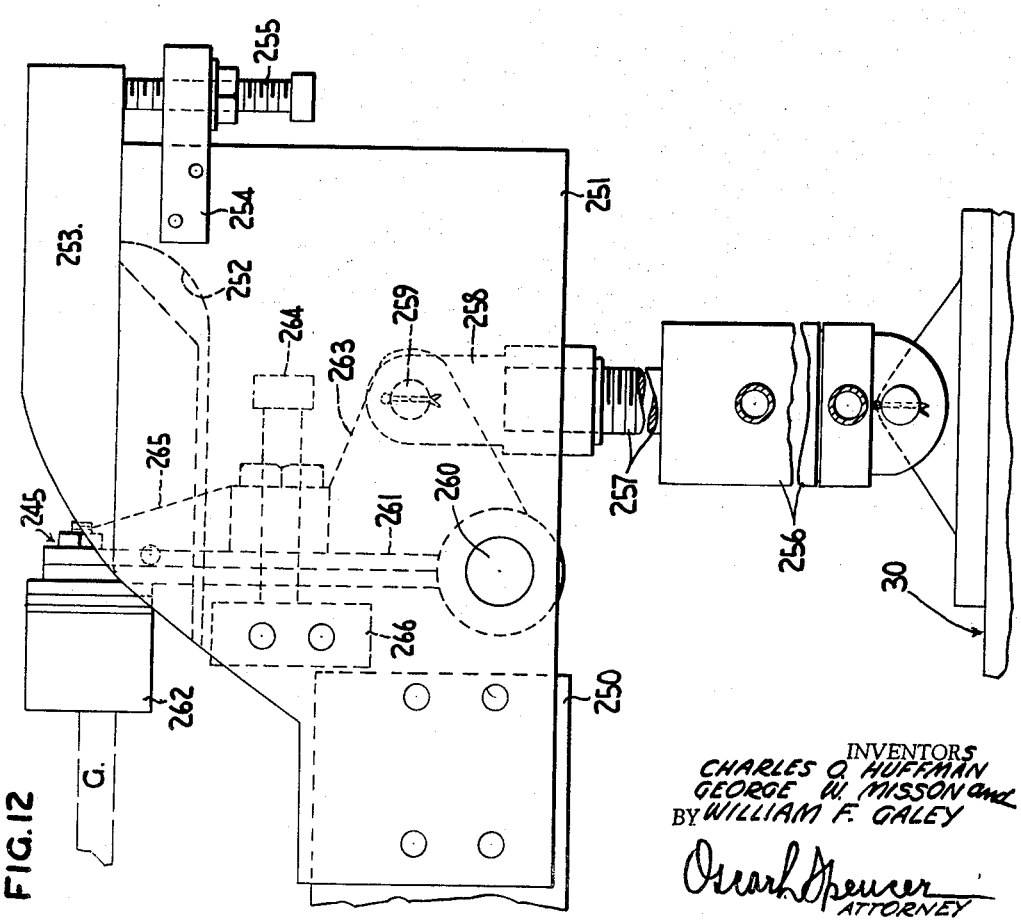

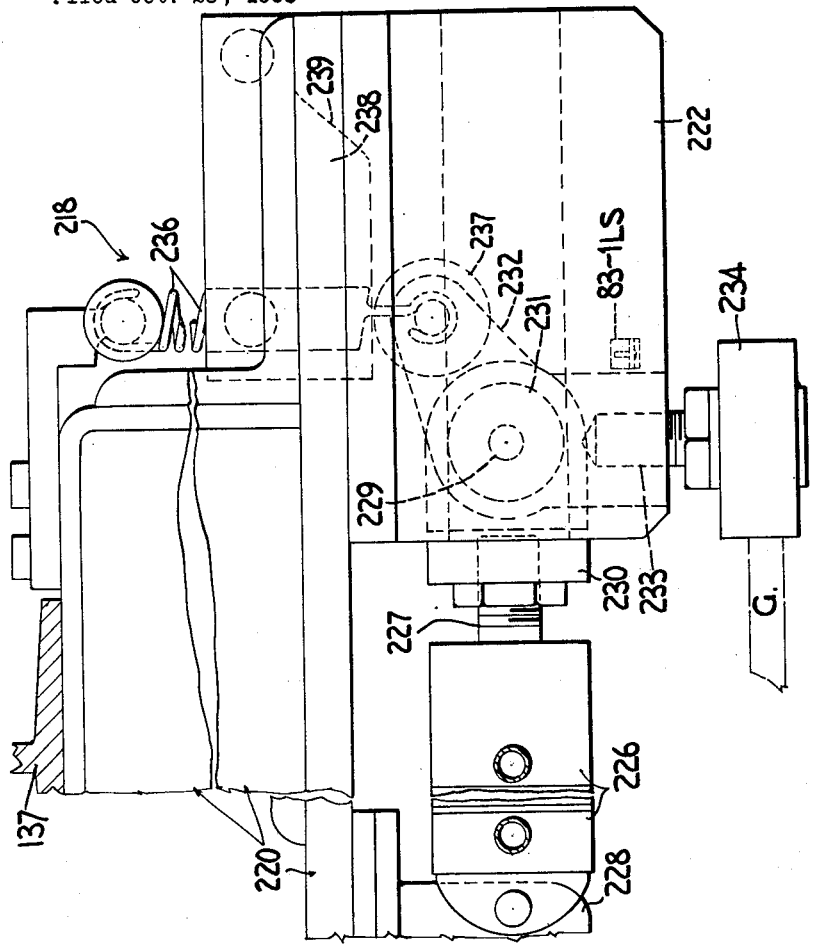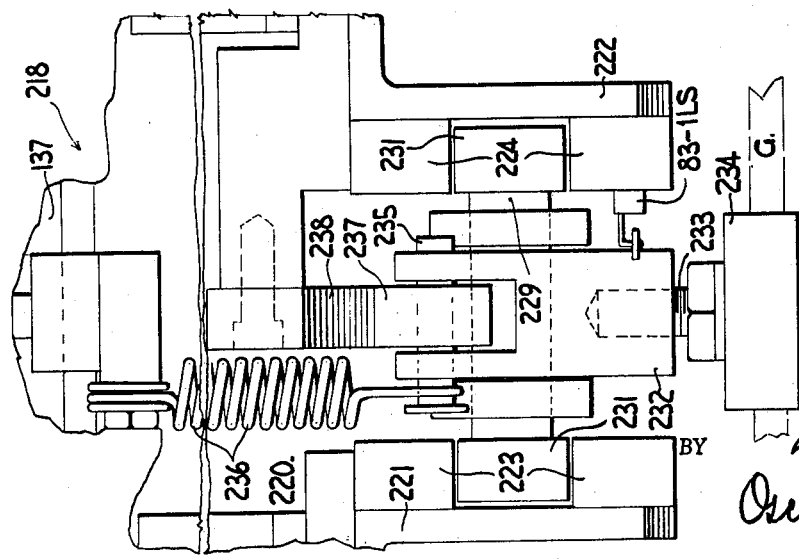

Sept. 1, 1964  C. O. HUFFMAN ETAL  3,146,926
GLASS CUTTING APPARATUS
Filed Oct. 23, 1958  13 Sheets-Sheet 6

INVENTORS
CHARLES O. HUFFMAN
GEORGE W. MISSON and
WILLIAM F. GALEY
BY
Oscar Spencer
ATTORNEY

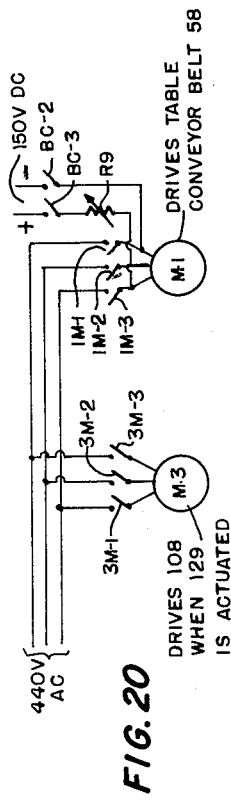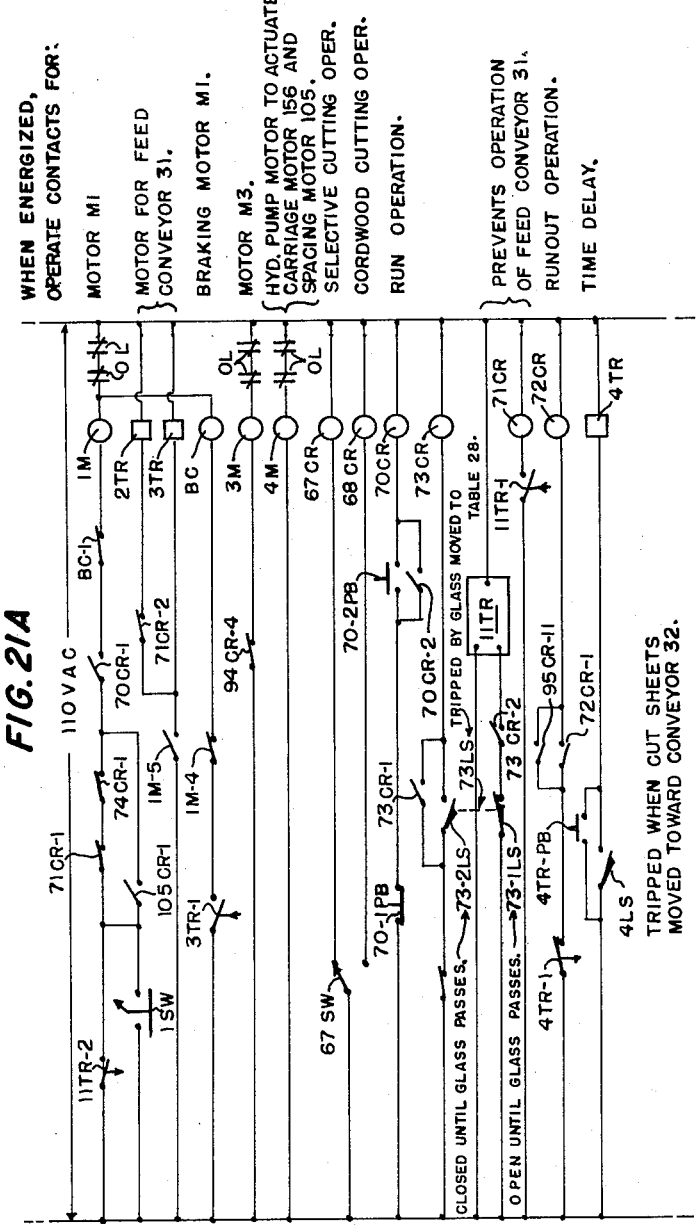

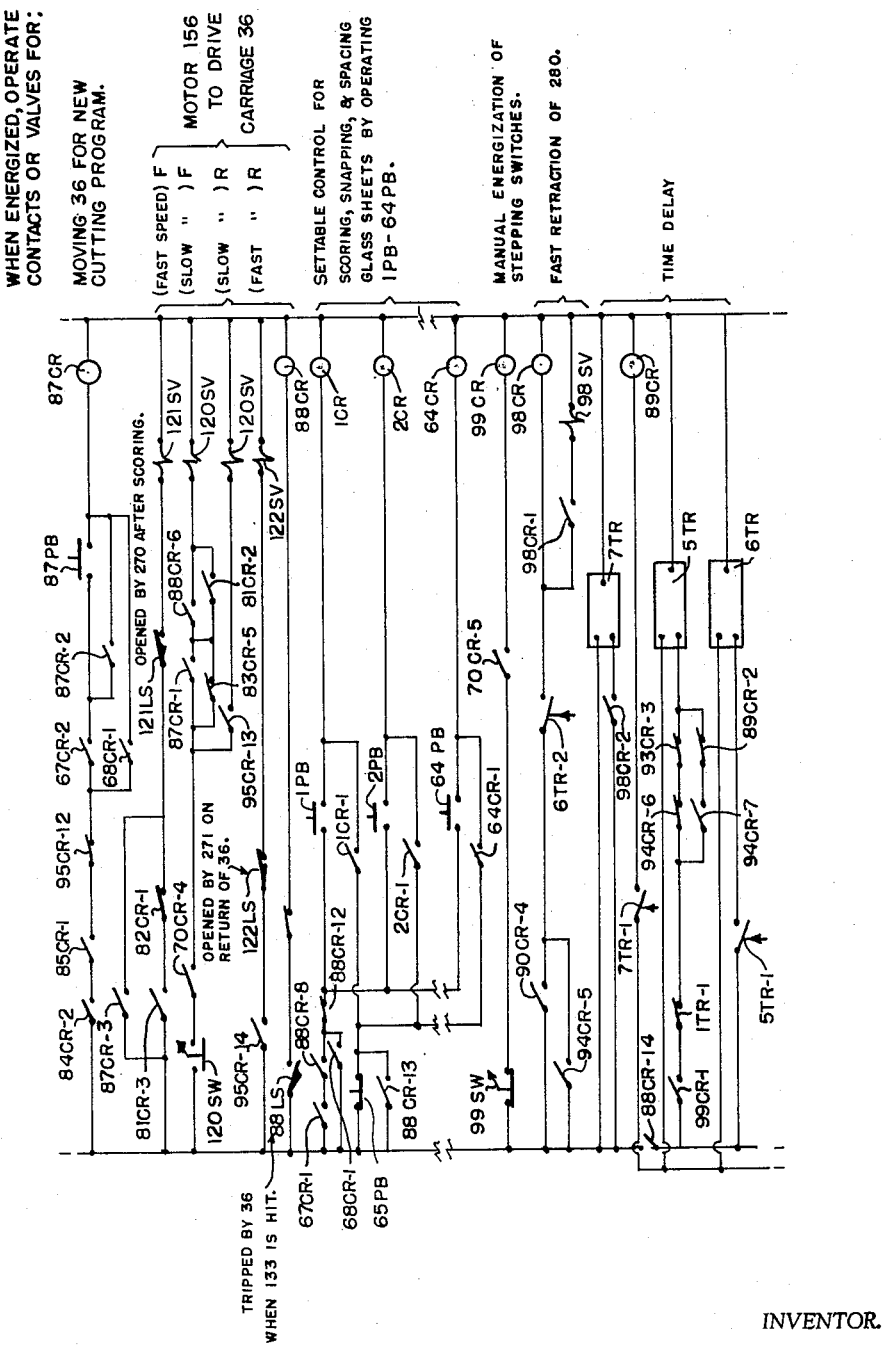

FIG. 2IC

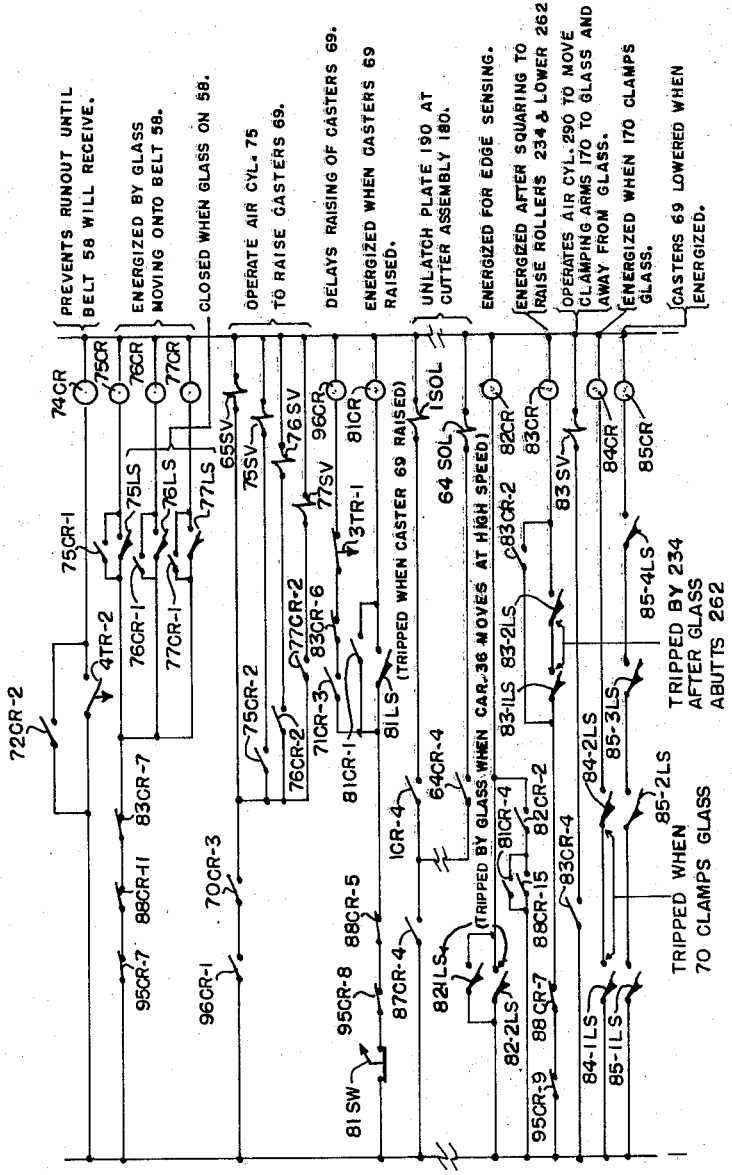

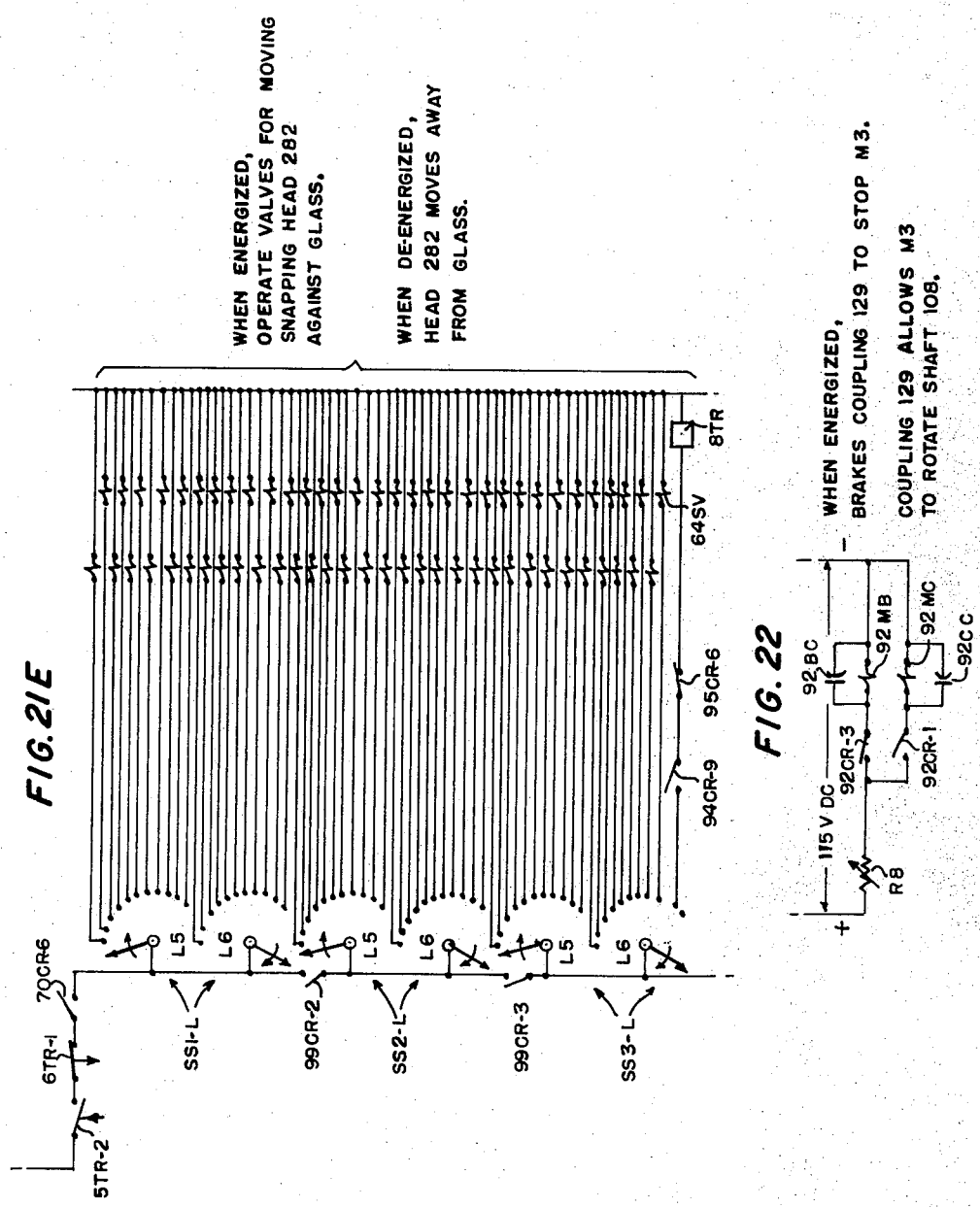

Sept. 1, 1964  C. O. HUFFMAN ETAL  3,146,926
GLASS CUTTING APPARATUS
Filed Oct. 23, 1958  13 Sheets-Sheet 12

INVENTOR.

Sept. 1, 1964     C. O. HUFFMAN ET AL     3,146,926
GLASS CUTTING APPARATUS

Filed Oct. 23, 1958     13 Sheets—Sheet 13

FIG. 24

LEGEND

| ILLUSTRATIVE REF. CHARACTER | SYMBOL | TYPE OF UNIT |
|---|---|---|
| ICR, IM, BC, SSI |  | COIL OF RELAY |
| 4TR, 6TR | 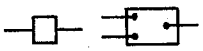 | COIL OF TIMER RELAY |
| ICR-I |  | NORMALLY OPEN RELAY CONTACT |
| ICR-I |  | NORMALLY CLOSED RELAY CONTACT |
| 5TR-I |  | NORMALLY OPEN TIMER RELAY CONTACT |
| 4TR-I |  | NORMALLY CLOSED TIMER RELAY CONTACT |
| SSI-L |  | STEPPING SWITCH |
| ISV | 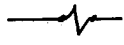 | SOLENOID COIL |
| IPB |  | NORMALLY OPEN PUSH BUTTON SWITCH |
| 70-IPB |  | NORMALLY CLOSED PUSH BUTTON SWITCH |
| I-SW | 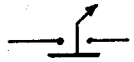 | NORMALLY OPEN MANUAL ON-OFF SWITCH |
| 99-SW | 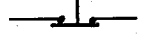 | NORMALLY CLOSED MANUAL ON-OFF SWITCH |
| OL | 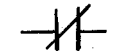 | MOTOR OVERLOAD PROTECTORS |
| 95-ILS |  | NORMALLY OPEN TRIPPED CLOSED LIMIT SW. |
| 90-LS | 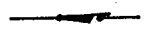 | NORMALLY CLOSED TRIPPED OPEN LIMIT SW. |

INVENTOR

BY

ATTORNEY

United States Patent Office 3,146,926
Patented Sept. 1, 1964

3,146,926
GLASS CUTTING APPARATUS
Charles O. Huffman, Ingram, George W. Misson, Fox Chapel, and William F. Galey, Saxonburg, Pa., assignors to Pittsburgh Plate Glass Company, Allegheny County, Pa., a corporation of Pennsylvania
Filed Oct. 23, 1958, Ser. No. 769,223
19 Claims. (Cl. 225—96.5)

This invention relates to an apparatus for automatically cutting a glass sheet into a number of smaller sheets and especially relates to an apparatus for automatically scoring a glass sheet along two or more parallel lines, preferably with prior alignment of the glass sheet, and then for snapping the scored glass sheet to run the cuts, preferably followed by spacing the glass sheets from one another prior to conveying them from the apparatus.

In the apparatus of the present invention, a glass sheet is moved into cutting position. The sheet is aligned. A carriage supporting a number of cutters is moved across the glass sheet to provide a number of parallel score lines that are transverse to the direction of movement of the glass sheet onto the apparatus. The glass sheet is snapped along the score lines to produce smaller glass sheets. These glass sheets are then spaced from each other prior to moving them from the apparatus. The scored glass sheet is preferably snapped along the individual score lines in sequence and after each snapping operation the newly formed opposed cut edges are spaced from each other before the next snapping operation while maintaining the spacing of the previously obtained opposed cut edges from prior snapping operations.

The apparatus of this invention has feeding and receiving conveyors between which are located a table with longitudinally extending top surface sections spaced transversely from one another. The table top has a surface convexly curved in the longitudinal direction. A conveyor, such as a belt conveyor, moves the glass sheet onto the table from the feeding conveyor and off the table onto the receiving conveyor. In the spaces between the sections of the table are means for raising the glass sheet from the table.

A carriage is mounted on the supporting structure of the apparatus to move transversely of the table. The carriage is provided with cutters and pushers, the latter moving the raised glass sheet toward and against stop members mounted on the supporting structure of the apparatus. The pushers on the carriage are constructed to be moved out of the way during further movement of the carriage. With the completion of alignment the glass sheet is lowered onto the table. The apparatus includes clamping devices that are then moved into engagement with the top marginal surfaces of the glass sheet at the leading and trailing edges. They prevent movement of the sheet. The carriage moves across the glass sheet so that some of the cutters, in accordance with a predetermined program, provide parallel score lines on the glass sheet.

A bottom snapping device is mounted on the supporting structure below each possible score line in the glass sheet provided by the cutters. Moment devices are mounted on the carriage so that each will be a short distance above the glass sheet. The moment devices are positioned so that one of them will be on each side of and a short distance from the possible score lines. In the construction where the possible score lines are uniformly spaced and close together, e.g., only two inches apart, only one moment device between each score is necessary. Of course, a moment device is also provided beyond each of the end score lines, and these are constructed so that they are lowered to a position slightly above the glass sheet only after the carriage has moved beyond the clamping devices during the scoring operation. With the carriage in the position farthest from its initial or home position after the scoring operation, the moment devices on the carriage are approximately in the same longitudinal vertical plane as the bottom snapping members. The appropriate bottom snapping devices are automatically operated to snap the glass sheet along the score lines to run the cuts by pushing the glass sheet up against the moment devices which resiliently restrain further movement of the glass sheet. The appropriate bottom snapping devices are operated in sequence.

The apparatus has a number of chains. After each snapping operation the chains, each having a number of pads mounted on some of the links, are raised between the table sections. The chains are driven before each operation with the top run of the chains moving in a direction opposite to the movement of the glass sheet onto the table to position the pads on the links so that the leading pad of each chain is slightly downstream of the score line to be snapped. Each of the chains is provided with a sufficient number of pads so that, during the cyclic movement of the chains as an entity, the chains in any given position of their drive will lift up the glass sheet formed from the last and any previous snapping operations and move them downstream a short distance.

At the completion of the automatic sequential snapping and spacing that is accomplished automatically in accordance with the predetermined program of scoring, the chains are automatically driven to their home position, the carriage is returned to its home position and the small glass sheets are conveyed from the table to the receiving conveyor.

The details of the apparatus of this invention for automatically carrying out these operations are described below in connection with the preferred embodiment taken along the drawings in which similar parts are generally designated by the same numeral and in which:

FIG. 3 is a plan view of the part of the apparatus, except for its chains, for spacing the glass sheets, cut from a larger glass sheet, before the sheets are conveyed away from the cutting apparatus;

FIG. 4 is a cross section taken along line 4—4 of FIG. 3;

FIG. 5 is an elevation of the part of the apparatus shown in FIG. 3;

FIG. 6 is a plan view of the cutter carriage of the apparatus without the alignment pushers, cutter assemblies and snapping devices;

FIG. 7 is a front elevation of the cutter carriage of FIG. 6, including some of its snapping devices, the arrangement for moving the carriage and showing a part of the general supporting structure with its rails and racks for the carriage;

FIG. 8 is a cross section along line 8—8 of FIG. 6;

FIGS. 9, 10 and 11 are schematic drawings of various positions of the spacing chains relative to the glass sheets at different stages of operation;

FIGS. 12 and 13 are side and front elevations of one of the retractable alignment stop members against which the glass sheet is pushed and of the cocking plates for moving the cutter assemblies to the latched inoperative position;

FIGS. 14 and 15 are rear and side elevations of one of the pusher devices;

FIGS. 20, 21A, 21B, 21C, 21D, 21E, 22 and 23 are schematic drawings of the electrical circuitry used in the preferred embodiment of the apparatus;

FIG. 24 is a lengend for the electrical wiring diagrams.

Figure 1:
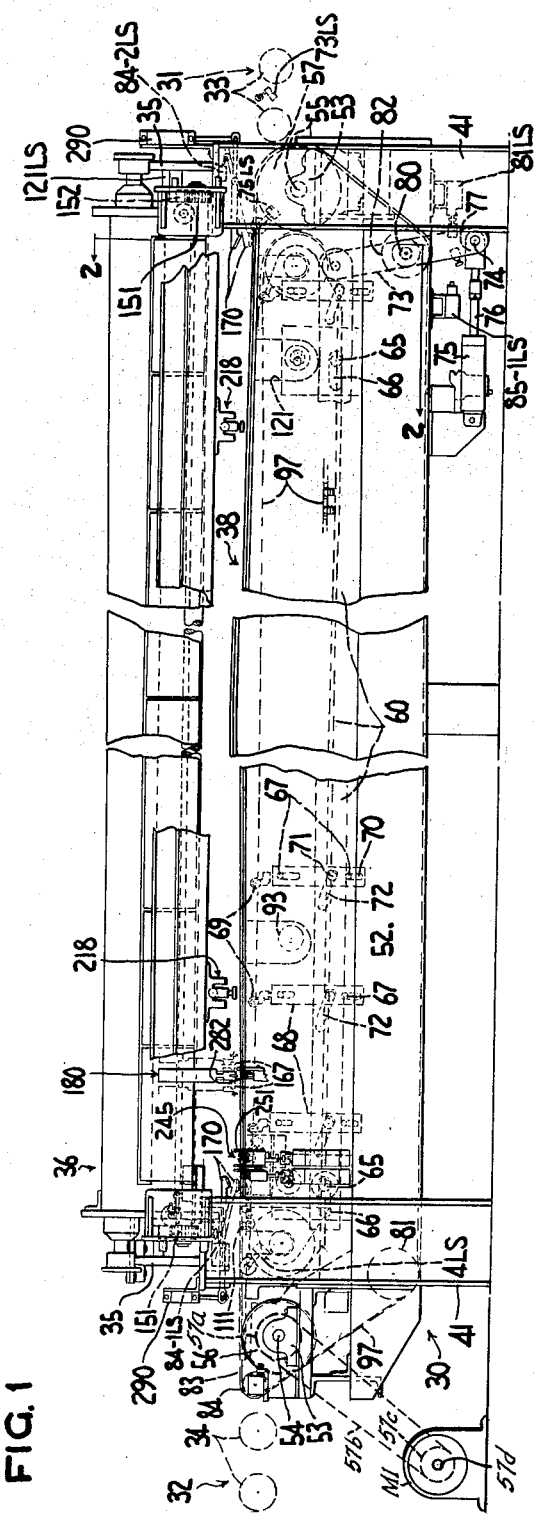
FIG. 1 is a front elevation, partially broken away, of the preferred embodiment apparatus of the present invention.

The apparatus has a supporting structure generally indicated at 30 between a feeding conveyor generally indicated at 31 and a receiving conveyor generally indicated at 32. The feeding conveyors 31 and 32 have rolls 33 and 34, respectively, driven by motors (not shown). Mounted on the supporting structure 30 is a pair of spaced parallel rails 35, which support a carriage generally indicated at 36.

A table generally indicated at 38 is supported at the ends by transverse plates 40, which are mounted on uprights 41 of the supporting structure. The table 38 comprises table sections generally indicated at 42, 43, 44, 45, 46 and 47, each of which has a pair of parallel plates 48 joined to the transverse plates 40 by angle irons 49. On the pair of plates 48 of each table section is a top plate 50. The table tops 50 are secured to plates 48 by angle irons 51. The table sections 42 through 47 are constructed so that top plates 50 are convexly curved in the longitudinal direction. This provides a crown in the top surface of the table 38.

A pair of longitudinally extending plates 52 are mounted on supports 41. On one end of plates 52 extending beyond one pair of supports 41 is mounted a pair of pillow blocks 53 in which are journaled a shaft 54. The supporting structure 30 between the other pair of uprights 41 supports a pair of pillow blocks 53 in which are journaled a shaft 55. Keyed on shafts 54 and 55 are pulleys 56 and 57, respectively. Shaft 54 is driven by a sprocket 57a keyed on it and sprocket is driven through a chain 57b and a sprocket 57c that it keyed on and driven by a shaft 57d of a motor M1 (FIGS. 1 and 20). Mounted on each set of pulleys 56 and 57 is a belt 58. The top run of each of belts 58 moves across one of table sections 42 through 47. With this arrangement the belts 58 receive a glass sheet G from conveyor 31, support sheet G on table 38 and move the smaller glass sheets obtained by the cutting onto receiving conveyor 32.

The apparatus is provided with a pair of longitudinally extending vertical bars 60, one between table sections 42 and 43 and one between table sections 43 and 44. Between table sections 44 and 45, between table sections 45 and 46 and between table sections 46 and 47 are similar bars 61, 62 and 63, respectively. Each of bars 60 through 63 is supported near its ends by stub shafts 65 extending horizontally from one of parallel plates 48 of table sections 42 through 46. The shafts 65 extend into longitudinal slots 66 in bars 60 through 63. Mounted on the same plates 48 of table sections 42 through 46 is a pair of horizontal rows of horizontally extending stub shafts 67. One shaft 67 of each row supports a vertically extending bar 68 having a horizontal top flange on which is mounted a caster 69. The shafts 67 are in vertical slots 70 of vertical bars 68. Each of vertical bars 68 has a stub shaft 71 extending horizontally from it into an inclined slot 72 in one of bars 60 through 63.

One end of each of bars 60 through 63 is pivotally connected to one end of a link 73. The other end of links 73 that are pivotally connected to bars 60 are pivotally connected to a shaft 74. An air cylinder 75 has the free end of its piston rod 76 connected to a bearing block 77 through which shaft 74 rotatably extends. The other end of each of links 73 that are connected to bars 61 through 63 is pivotally connected to the free end of piston rod of an air cylinder (not shown). A horizontal shaft 80 is mounted between plates 52. The links 73 are pivotally supported on a shaft 80. This pivotal support is intermediate the ends of links 73. With this construction the retraction of piston rod 76 of air cylinder 75 moves bars 60 from left to right as viewed in FIG. 1, with the result that the two sets of casters 69 between table sections 42 and 43 and between table sections 43 and 44 are raised. The retraction of the piston rods of the other air cylinders connected through link 73 to bars 61 through 63 raises casters 69 between table sections 44 and 45, between table sections 45 and 46 and between table sections 46 and 47, respectively.

The belts 58 driven by pulleys 56 move over pulleys 57 and idler pulleys 81 and 82 rotatably mounted on the supporting structure 30.

Between belts 58 at the left-hand end are belts 83 that are driven by pulleys (not shown) mounted on shaft 54. The belts 83 also move around pulleys 84 rotatably mounted on the supporting structure 30 between pulleys 56 and the next adjacent roll 34 of conveyor 32. The belts 83 are used to insure that narrow strips of glass from a cutting operation such as the trimming of the leading and trailing portions of glass sheet G are moved beyond supporting structure 30 so that they will fall into a cullet hopper (not shown) between pulleys 84 and the first of rolls 34.

The apparatus further includes a spacing device or frame generally indicated at 90 (FIG. 3), which has a plate 91 and a number of plates 92, which are parallel to each other and to plate 91. The longitudinal plates 91 and 92 are maintained in spaced relationship by tubes 93, which extend through them. Plates 91 and 92 are bolted to flanged rings 94 secured on tubes 93 so as to maintain the plates 91 and 92 in their parallel relationship. The plates 92 are in the spaces between the table sections 42 through 47. Through one end of plates 91 and 92 is journaled a shaft 95. Each of plates 92 has mounted alongside its top portion a longitudinally extending guide 96 for a chain 97. Fixed on shaft 95 are sprockets 98 in alignment with guides 96, which do not extend the full length of plates 92 as indicated in FIGS. 3 and 5. At the other end of each of plates 92 is fixed a stub shaft 99 on which is rotatably mounted a sprocket 100. Each of sprockets 100 is in alignment with one of sprockets 98. The latter end of plate 92 has mounted on it an extension bracket 101 that has a top horizontal extending flange 102. The extensions 102 serve to support at least part of the first glass sheet cut from sheet G during the first spacing operation.

The shaft 95 is connected at one end to a universal coupling 103 connected to a shaft 104 driven by a hydraulic motor 105 mounted on the supporting structure 30. The universal coupling 103 is necessary because the spacing device 90 is moved through a cyclic path as an entity during the spacing operation. The spacing device or frame 90 and the means to move the frame in a cyclical path in the preferred embodiment constitute means for moving the top run of chains 97 in a cyclical path. This is true because sprockets 98 and 100 which are engaged by chains 97 are rotatably mounted on frame 90.

Each of tubes 93 nearest the ends of plates 91 and 92 has a shaft 108 extending through them and rotatably supported at one end by bearings (not shown) on the supporting structure 30. Each of shafts 108 by eccentric bearings 110 supports plate 91 and plate 92 farthest from the plate 91 so that, with rotation of shafts 108, the plates 91 and 92 are moved as an entity in the cyclic path. Thus, eccentric bearings 110, shafts 108 and the means to rotate shafts 108 constitute means to move frame or spacing device 90 in a cyclical path. This eccentric mounting of the spacing device or frame 90, upon rotation of shafts 108, moves plates 91 and 92 upwardly and to the left as viewed in FIG. 5 and then downwardly and to the left until the plates 91 and 92 are in a position directly to the left of that shown in FIG. 5. Then the plates 91 and 92 are moved to the right downwardly and then upwardly until they have returned to the position shown in FIG. 5. During the raising of plates 91 and 92 to the left, pads 111 on chains 97 (FIGS. 9-11) in the top run portion of chains 97 are raised sufficiently for pads to lift up any glass sheet above them and to move it laterally, i.e., to the left before chains 97 are lowered during the cyclic movement of the spacing device 90.

The parallel plates 48 of table sections 43 through 47 have vertical slots 121 through which pass tubes 93 and shaft 95 so that spacing device 90 can be moved in its cyclic path by rotation of shaft 95 without shaft 95 and tubes 93 touching plates 48.

The shafts 108 are supported at the end by bearings 112 mounted on brackets 113 of the supporting structure 30. Secured on this end of each of shafts 108 are gears 116 driven by gears 117 secured on shaft 118 rotatably supported by bearings 119 on brackets 113 and intermediate bracket 120 of the supporting structure 30. A gear 125 keyed on shaft 118 meshes with a gear 126 driven by a gear reducer 128 operated by an electric motor M3 through an electric clutch brake coupling 129.

The plates 92 are provided with bottom horizontal flanges to which are secured longitudinal brackets 130. These bottom flanges of plates 92 and brackets 130 support and guide chains 97 during their bottom run.

Figure 2:
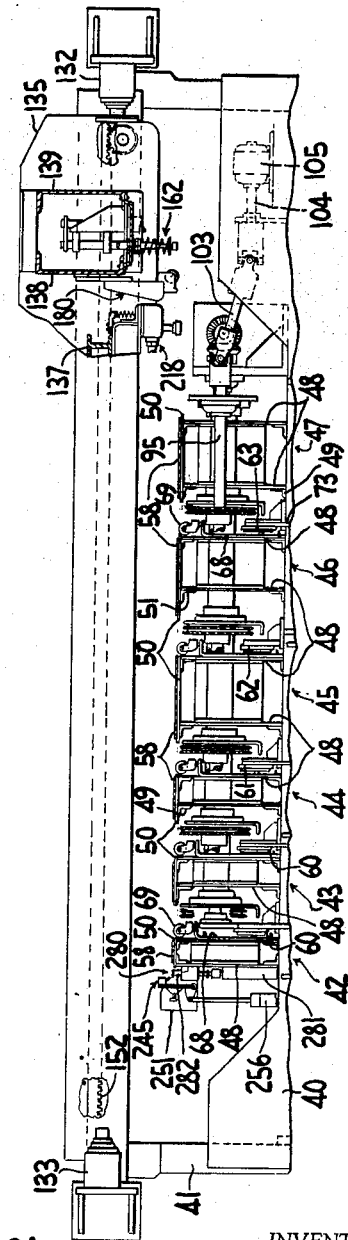
FIG. 2 is a cross section taken along line 2—2 of FIG. 1 but with the spacing chains removed.

The carriage 36 is moved on rails 35 between its home position against stop members 132 mounted on supporting structure 30 as shown in FIG. 2 and its snapping position where the carriage 36 abuts stop members 133 shown at the far left of FIG. 2 and mounted on the supporting structure 30. The carriage 36 has a pair of plates 135 spaced from each other by I-beam 137 and by channel irons 138 and 139. The I-beam 137 is secured to plates 135 by angle irons 140. The channel irons 138 and 139 are secured to plates 135 by angle irons 141. The channel irons 138 and 139 are joined to each other intermediate their ends by short plates 142.

Mounted on the outside faces of plates 135 are stub shafts 143 on which are rotatably mounted wheels 144. The wheels 144 ride on rails 35. A bracket 145 is also mounted on the outside face of one of plates 135. The bracket 145 supports below it three guide rolls 146. Two of guide rolls abut one side of one of rails 35 and the third roll 146 abuts the opposite side of rail 35.

A shaft 147 is rotatably supported by bearings 148 mounted on plates 135 and by bearings 149 mounted on brackets 150 secured to channel iron 139. The shaft 147 extends through plates 135. Keyed on the ends of shaft 147 are gears 151 that mesh with racks 152 supported by rails 35 so that the teeth of the racks 152 extend downwardly as shown in FIG. 7. A support plate 153 is secured to channel iron 139 intermediate brackets 150. A gear 154 is keyed on shaft 147 opposite plate 153. The gear 154 is driven by a gear reducer 155 mounted on support plate 153. The gear reducer 155 is driven by a hydraulic motor 156 supported by the housing of gear reducer 155.

The I-beam 137 is in front of the channel irons 138 and 139 and the latter are in front of shaft 147, i.e., I-beam 137 moves ahead of channel irons 138 and 139 when carriage 36 moves from its home position. The carriage 36 is constructed so that shaft 147, I-beam 137 and channel irons 138 and 139 are spaced above the glass sheet G.

The front face of channel iron 138 supports a pair of bars 157 (FIGS. 7 and 8) on which are mounted a number of plates 158. Secured to the bottom flanges of channel irons 138 and 139 is a channel iron 159 having lateral flanges 160 extending away from each other. Moment devices generally indicated at 162 (FIGS. 7 and 8) are supported by channel iron 159. The moment devices 162 are positioned in the preferred embodiment of the apparatus on two-inch centers. All but the two moment devices 162 at each end are constructed as follows. The moment device 162 has an externally threaded tube 163 with a thicker wall at its top portion. The threaded portion extends through channel iron 159 and is secured in upright position by a pair of nuts 164 above and below channel iron 159, as shown in dotted lines. Below the bottom nut 164 is a pair of nuts 165 threaded on sleeve 163, also shown in dotted lines in FIG. 8. In sleeve 163 is a shaft 166 having a top enlarged end resting on the top of sleeve 163. The shaft 166 extends below sleeve 163 and mounted on its end is a moment head 167. The bottom surface of head 167 is convex in the direction transverse to the direction of movement of the carriage 36. A washer 168 is mounted on shaft 166 above head 167. Between washer 168 and the bottom of nuts 164 is a spring 169. The top nut 165 serves as a lock nut. With this construction the head 167 resiliently opposes upward movement of glass sheet G.

The end moment devices 162 are constructed somewhat differently so that they can be raised a substantial distance. These moment devices 162 are in the raised position until the carriage 36 has passed clamping arms 170 mounted on the supporting structure 30, described in detail below, during the cutting operation. Instead of using nuts 164 for supporting sleeve 163, as is the case in most of the moment devices, the thicker wall portion of sleeve 163 extends upwardly a considerable distance beyond the enlarged head of shaft 166. The sleeve 163, in this case, is connected near its end by a plate 171 extending radially connected near its top end by a plate 171 secured to the end of a piston rod 172 of an air cylinder 173 mounted with the rod 172 parallel to sleeve 163. The plate 171 serves to connect the two sleeves 163 at the both ends of carriage 36 to piston rod 172. The two sleeves 163 of each end moment device 162 slide in bearing supports 174 mounted on a bracket 175 supported by channel iron 159. The air cylinder 173 is also supported by bracket 175. With this construction the moment heads 167 of the two moment devices 162 at each end of the set of moment devices 162 are constructed so that they resiliently resist upward movement but can be raised to pass above clamping arms 170.

The cutter assemblies, generally indicated at 180, are mounted in the preferred embodiment of the apparatus at two-inch centers on plates 158. There are 64 cutter assemblies 180 in the embodiment. Each has a channel-shaped bracket 181 having side walls 182. Solenoids 1SOL through 64SOL are mounted on the 64 brackets 181. A pin 184 is supported by walls 182 of each assembly 180. The latches 185 and solenoids 1SOL through 64SOL constitute relay-actuated means separately and operatively associated with cutter wheels 196 to retain cutter wheels 196 in the raised position. A latch 185 is pivotally mounted on pin 184 and is rotatably connected between shaft 184 and its other end by a pin 186 to a clevis-ended shaft 187 of one of solenoids 1SOL through 64SOL.

Considerably below pin 184 is a pin 188 also supported by walls 182. Rotatably mounted on pin 188 is a hub 189 to which is bolted a cutter pivot support plate 190 that extends upwardly with a flange 191, abuts the latch 185 and extends downwardly from hub 189. A second plate 192, secured to the other end of hub 189, extends downwardly parallel with plate 190. The bottom portions of plates 190 and 192 have inverted J-shaped slots 193 in which are supported a shaft 194 of a turret cutter device generally indicated at 195.

In the turret cutter device 195 are mounted radially a number of glass cutter wheels 196. The turret cutter device 195 has a pair of parallel circular plates 197 between which are rotatably mounted the glass cutters 196. One of circular plates 197 has a number of peripheral radial slots 198. A manual release latch 199 is rotatably supported by a stub shaft 200 mounted on plates 190 and 192. The latch 199 is biased into the position shown in FIGS. 17 through 19 by a spring 201 so that the detent 202 at one end of latch 198 engages one of slots 198. The latch 199 has an arm 203 extending outwardly from plates 190 and 192. An operator, by depressing arm 203, disengages detent 202 from one of slots 198 so that the turret cutter device 195 can be rotated to place a different glass cutter 196 into the lowermost position for use in cutting.

The plate 190 has another flange 204 through which is threaded a shaft 205 which turns an indicating dial 206 when a knurled knob 207 on shaft 205 is turned. A spring 208 extends through bracket 181 and is supported at its ends by shaft 205 and a stub shaft 209 mounted in a housing 210 mounted on bracket 181. By rotation of knurled knob 207, the shaft 205 is moved toward or away from stub shaft 209. This results in adjustment of the downward force of the bottom of plates 190 and 192 and thus wheel 196 toward the glass sheet G to be cut.

A latch 211 is pivotally and intermediately supported by plates 190 and 192 using pin 212. The latch 211 rotatably supports at its bottom end a roller 213. The top portion of the latch 211 has an arm 214 that abuts a flange 215 extending in a vertical slot of bracket 181.

Figure 19:
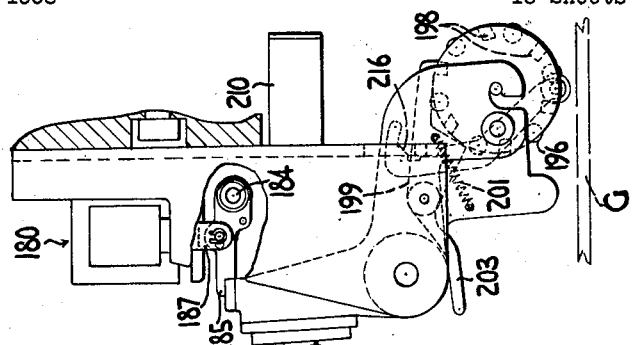
FIGS. 17, 18 and 19 are side views of the cutter assembly of FIG. 16 showing different positions of the cutter wheel at various positions of the carriage.
Figure 18:
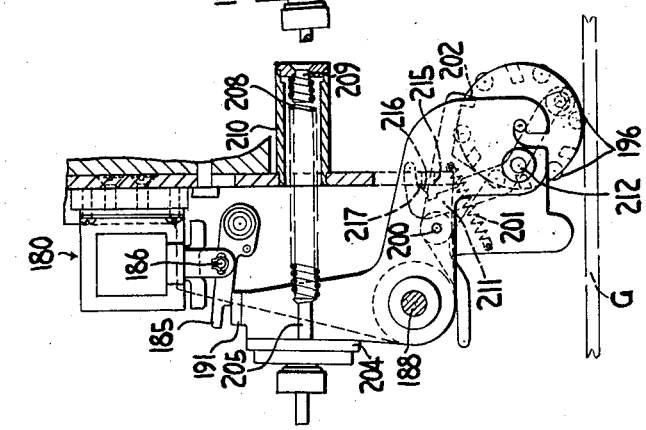
Figure 17:
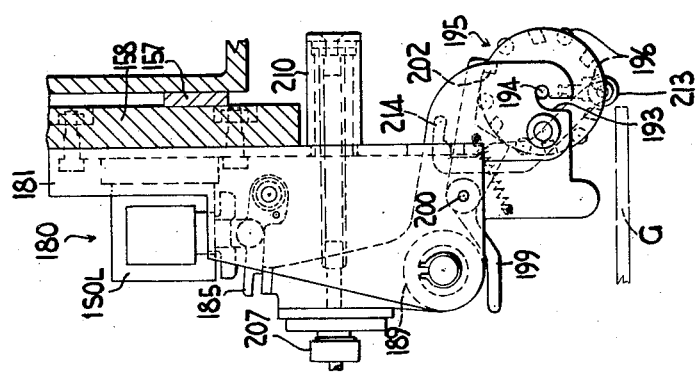
Figure 16:
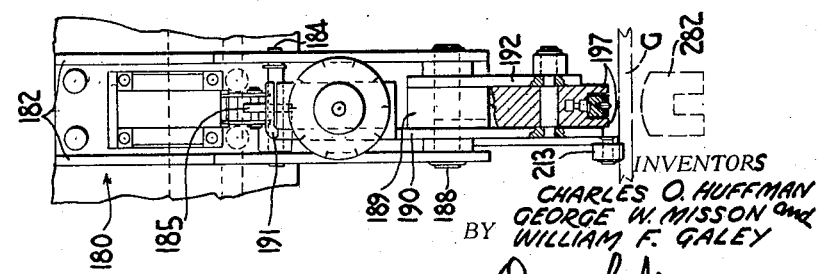
FIG. 16 is a fragmentary front elevation of one of the cutter assemblies mounted on the carriage and shows also in dotted lines the position of the snapping member below it and the glass sheet.

For each cutter assembly 180 that has had its solenoid (one of 1SOL through 64SOL) energized to raise latch 185 momentarily, the plate 190 rotates about shaft 188 to lower arm 214 of latch 211 from the position shown in FIG. 19 to that in FIG. 17 where arm 214 abuts flange 215. When the carriage 36 is moved to the edge of sheet G, the roller 213 rides up the edge of sheet G thereby pivoting latch 211 to remove its portion 214 away from flange 215 so that plates 190 and 192 pivot about shaft 188. The cutter wheel 196 is lowered onto sheet G just inwardly of its edge. At the same time the latch 211 is moved so that flange 215 first abuts cam surface 216 and then shoulder 217 of arm 214 so as to hold latch 211 in position where roller 213 is held in position spaced above the glass sheet G as shown in FIGS. 18 and 19.

Limit switches 82–1LS and 82–2LS are secured to the bottom surface of I-beam 137 of carriage 36. Also mounted on the bottom of I-beam 137 are two glass sheet alignment pusher assemblies generally indicated at 218, each having a pair of support brackets 220. From each of brackets 220 depends angle irons 221 and 222 spaced in parallel relationship. On angle iron 221 is mounted a pair of bars 223 that are spaced to provide a horizontal passage. Similarly mounted on angle iron 222 is a pair of bars 224 similarly spaced to provide a horizontal passage. A limit switch, designated 83–1LS for one of assemblies 218 and 83–2LS for the other assembly 218, is mounted on lower bar 224. Each assembly 218 has an air cylinder 226 with a piston rod 227. The cylinder 226 is pivotally supported at one end to a plate 228 of bracket 220. A shaft 229 is supported by clevis 230 secured at the end of piston rod 227. Rollers 231 rotatably mounted on shaft 229 ride on lower bars 223 and 224 in the horizontal passages referred to above.

A bell crank 232 is mounted on shaft 229 between the arms of clevis 230. A shaft 233 on which is rotatably mounted a roller 234 is threaded into one arm of bell crank 232. The other arm of bell crank 232 has a forked construction through which is mounted a shaft 235. Near one end of shaft 235 is connected a spring 236 that is secured at its other end to a part of bracket 220. A cam follower 237 is rotatably mounted on shaft 235 between the forked portion of the bell crank 232. A cam plate 238 is supported by the bracket 220. The cam follower 237 is urged against the bottom surface of cam plate 238 by spring 236. When the piston rod 227 is in the retracted position, as shown in FIG. 15, the cam follower 237 abuts cam plate 238 so that the pusher roller 234 is positioned with shaft 233 in a vertical position. When the piston rod 227 is being extended, the cam follower 237 moves along the bottom surface of cam plate 238 until follower 237 rolls along the inclined surface portion 239 of cam plate 238, because spring 236 maintains follower 237 against cam plate 238. As a result bell crank 232 rotates about shaft 229, thereby raising pusher roller 234 above glass sheet G. This movement of bell crank 232 with consequent raising of pusher roller 234 by the extension of piston rod 227 occurs after bell crank 232 and pusher roller 234 have been moved a short distance to the right, as viewed in FIGS. 15, so as to trip limit switches 83–1LS and 83–2LS of assemblies 218. This movement of a short distance occurs when carriage 36 continues to move, even though glass sheet G has been moved by pusher rollers 234 against alignment stop assemblies generally indicated at 245. As seen in FIG. 2, the pusher rollers 234 are mounted ahead of cutter wheels 196 of cutter assemblies 180 on carriage 36.

As seen in FIGS. 12 and 13, supported on plates 250 mounted on supporting structure 30 are cocking plates 251, each of which is in alignment with plate 190 of one of cutter assemblies 180. Each cocking plate 251 has a recess 252 in its top surface in which is pivotally mounted a bottom portion of cam plate 253 that cooperates with cocking plate 251 to provide a cam surface for engagement with the leading curved bottom portion of plate 190 of cutter assembly 180. As the carriage 36 moves into the snapping position, cocking plate 251 and cam plate 253 rotate plate 190 counterclockwise as viewed in FIG. 19. This occurs after carriage 36 moves cutter wheels 196 forwardly of the front end of sheet G. The detent portion of latch 185 can fall to latch the plate 190 in a position where the bottom of cutter wheel 196 of turret cutter device 195 is in a horizontal plane above glass sheet G. This is possible because the solenoid, one of solenoids 1SOL through 64SOL, was deenergized before the carriage 36 moved across glass sheet G. A bracket 254 mounted on cocking plate 251 supports a bolt 255 that provides for adjustment of the position of the cam plate 253.

Each of the pair of stop assemblies 245 has an air cylinder 256 pivotally mounted on the supporting structure 30 about a horizontal axis. The piston rod 257 of cylinder 256 has a clevis 258 on its end. A pin 259 is mounted on clevis 258. A shaft 260 is rotatably supported by a pair of cocking plates 251. An arm 261 is fixed on shaft 260. At the end of arm 261 is mounted a stop member 262 that is abutted by glass sheet G when the latter is moved by pusher rollers 234. A bracket 263 mounted on arm 261 is connected to clevis 258 by pin 259. With this arrangement the air cylinder 256 with its piston rod 257 in its extended position has the stop member 262 in the position to be abutted by glass sheet G as shown in FIGS. 12 and 13. After this abutment for alignment of glass sheet G, air cylinder 256 is operated to retract piston rod 257 thereby moving the stop member 262 away from glass sheet G by rotation of arm 261 about the axis of the shaft 260. When thus rotated, the stop member 262 is to the right of (as viewed in FIG. 12) and below the cam surface of cocking plates 251.

Bolts 264 are mounted on arm 261 by bracket 265. The bolts 264 abut stop members 266 mounted on cocking plates 251. This construction provides for adjustment of stop member 262 when arm 261 of each of assemblies 254 is in its raised position.

In FIGS. 9, 10 and 11 there are shown the relative positions of pads 111 on chains 97 at different stages of the operation of the apparatus. In these schematic drawings, it is assumed that glass sheet G has been provided with two score lines which extend only partially through the glass sheet. The glass sheet G has been thus scored to produce after snapping three smaller glass sheets designated G–1, G–2 and G–3. After the snapping of the first score line to produce glass sheet G–1, chains 97, sprockets 88 and 100, and plates 91 and 92 are moved through a cyclic path by eccentric bearings 110 in a counterclockwise direction as viewed in FIG. 9. As a result the leading pads 111 under glass sheet G-1 which has been just produced by a snapping operation of the first score line is raised and moved to the left, as viewed in FIG. 1, to produce the arrangement of glass sheets as seen in FIG. 10. The chains 97 are then driven in a programmed manner as described below in connection with the electric circuitry, so that the leading pads 111 on chains 97 are moved to the position indicated in FIG. 10. After the snapping of the second score line, the chain 97, sprockets 98 and 100, and plates 91 and 92 are moved through the cyclic path again by one revolution of shafts 108. This spaces newly formed glass sheet G-2 from newly formed glass sheet G-3. At the same time other pads 111, which are under glass sheet G-1, lifted it and moved it the same distance that glass sheet G-2 has been moved so as to maintain the spacing between sheets G-1 and G-2 as shown in FIG. 11. In the latter figure the sheet has been driven so that the leading pads 111 on chains 97 are now approximately under the trailing edge of what was glass sheet G. Because there is no longer any spacing of glass sheets to be accomplished, the chains 97 are then driven to the home position as described below in connection with the electrical circuits.

A normally open limit switch 4LS is mounted on the supporting structure 30 between pulleys 56 and sprockets 100 so that the switch is closed when the cut glass sheets, e.g., sheets G-1, G-2 and G-3, are moved by belts 58 toward receiving conveyor 32.

A limit switch 73LS is mounted between the two rolls 33 of feeding conveyor 31 closest to belts 58. The limit switch 73LS is tripped by the leading edge of a glass sheet G being moved to table 38. The limit switch 73LS has a normally closed contact 73-1LS and a normally open contact 73-2LS so that the glass sheet being fed onto table 38 keeps the former open and the latter closed until the trailing edge of sheet G passes beyond limit switch 73LS.

Normally open limit switches 75LS, 76LS and 77LS are mounted on the supporting structure between pulleys 57 and sprockets 98 so that they are closed when glass sheet G rests on table 38. Limit switch 75LS is placed between table sections 44 and 45, limit switch 76LS is placed between table sections 45 and 46 and limit switch 77LS is placed between table sections 46 and 47.

In the illustrative embodiment of the apparatus glass sheet G to be cut is assumed to have a uniform length that places its leading and trailing margins in a position to be clamped by arms 170. It is also assumed that the minimum width of sheet G is approximately the width to be engaged by the two rows of casters 69 between table sections 42 and 43 and between table sections 43 and 44 when these casters are raised. When the width of sheet G is sufficiently great to trip limit switch 75LS, sheet G will also be above the row of casters 69 between table sections 44 and 45. When the width of sheet G is sufficient to trip both limit switches 75LS and 76LS, sheet G will be above all rows of casters 69 except the row between table sections 46 and 47. If the sheet G is sufficiently wide to also trip limit switch 77LS, sheet G will also be above the row of casters 69 between table sections 46 and 47. With this construction only those rows of casters 69 below sheet G will be raised for the squaring or alignment operation described below in connection with the electrical circuits. Otherwise, raised casters 69 to the right (as viewed in FIG. 2) of sheet G could interfere with glass sheet sensing limit switches 82-1LS and 82-2LS, with pusher assemblies 218 and with cutter assemblies 180.

The apparatus is also provided with five normally open limit switches mounted on supporting structure 30 and designated 81LS, 85-1LS, 85-2LS, 85-3LS and 85-4LS. The limit switch 81LS is mounted on the supporting structure so that it is tripped by one of links 73 that raises one of the rows of casters 69 between table sections 42 and 43 or between table sections 43 and 44. This link 73 trips switch 81LS to close its contact when link 73 is positioned by its associated air cylinder 75 so that casters 69 are in their lowered position. The limit switches 85-1LS, 85-2LS, 85-3LS and 85-4LS are positioned to be tripped by links 73 when the latter are positioned by their associated air cylinders 75 to have in their raised position the corresponding rows of casters 69 between table sections 44 and 45, between table sections 45 and 46 and between table sections 46 and 47, respectively.

Cam rails 270 and 271 are adjustably mounted on the outside face of one of plates 135. The cam rail 270 is positioned so that it opens a normally closed limit switch 121LS when carriage 36 has moved sufficiently far from its home position for one or more cutter wheels 196 to have completed the scoring of glass sheet G. The limit switch 121LS is held open by cam 270 until the carriage 36 passes that point on the movement of the carriage toward its home position. The cam 271 is positioned so that, during the return movement of carriage 36, cam 271 opens a normally closed limit switch 122LS shortly before carriage 36 reaches its home position. Cam 271 maintains switch 122LS open until carriage 36 during the next cycle of operation moves beyond the position where cam 271 opened switch 122LS. Limit switches 121LS and 122LS are mounted on the side of upstream rail 35.

As seen in FIGS. 1 and 2, the apparatus has a number of snapping devices generally indicated at 280. In the illustrative embodiment there are 64 snapping devices 180 mounted on the left-hand (as viewed in FIG. 2) plate 48 of table section 42. The snapping devices are positioned to provide two-inch centers in the preferred embodiment. Each snapping device 280 has a solenoid valve of the four-way type, and these are designated 1SV through 64SV. Each solenoid valve controls the direction of fluid flow to one of 64 hydraulic cylinders 281 so that, when one of solenoid valves 1SV through 64SV is energized, the cylinder of the associated hydraulic cylinder 281 moves to its extended position. Each hydraulic cylinder 281 is part of one of snapping devices 280. In FIG. 1 only two of the hydraulic cylinders 281 are shown.

A snapping head 282 is mounted on the end of the piston rod of each hydraulic cylinder 281 and the axis of the piston rod is vertical. The top surface of head 282 is constructed like the bottom surface of moment heads 167. The cylinders 281 are positioned so that each snapping head is in a plane traversed by one of the cutter wheels 196. The glass sheet C is moved by feeding conveyor 31 to belts 58 above table 38 with the front margin of sheet G above table section 42. However, after the alignment, sheet G has its front margin to the left of table section 42 and above snapping heads 282. When one of solenoid valves 1SV through 64SV is energized, the associated hydraulic cylinder raises head 282 of that snapping device 280 up against the bottom surface of glass sheet G to run the cut that was produced by the scoring of the glass by the cutter wheel 96 moving across and in contact with sheet G in that vertical plane. When one of solenoid valves 1SV through 64SV is deenergized, the fluid flow to cylinder 281 is changed to retract the piston rod of hydraulic cylinder 281. This moves snapping head 282 away from the glass sheet. The solenoid valves 1SV through 64SV and their associated hydraulic cylinders 281 constitute relay-actuated means separately associated with each snapping head 282 to lift upwardly the corresponding snapping head 282 against glass sheet G at a margin to raise glass sheet G.

Most of the electrical circuits for the preferred embodiment of the apparatus use 110-volt alternating current. A 115-volt direct current is used to operate three stepping switches, SS1, SS2 and SS3 (FIG. 23) and to energize a coil 1TR of a time delay relay of the off delay type through some of the levels of banks of contacts of these stepping switches. The relay 1TR prevents the energization of solenoid valves 1SV through 64SV, that would cause snapping of the glass, during the stepping portions or intervals of the operation of these stepping switches. The only other instances, in which current other than 110-volt alternating current is used, are the circuits for FIGS. 20 and 22.

In circuitry of FIG. 20 motor M1, that drives belts 58 through sprocket 57c, chain 57b and chain 57a, is connected through normally open contacts 1M–1, 1M–2, and 1M–3 to a 440-volt A.C. source. The motor M1 is of the reluctance synchronous type and when contacts 1M–1, 1M–2, and 1M–3 are opened, as described below, the motor M1 is rapidly stopped by closing a pair of normally open contacts BC–1 and BC–2. By contacts BC–2 and BC–2 the motor M1 is connected to a 150-volt D.C. source for rapid braking of motor M1. Also connected to the 440-volt A.C. source through normally open contacts 3M–1, 3M–2, and 3M–3 is eccentric drive motor M3 that rotates shafts 108 mounted on eccentric bearings 110 when clutch 129 is energized to provide the glass sheet spacing operation described above. The contacts 3M–1, 3M–2, and 3M–3 are closed by the energization of a coil 3M of a relay in one of the 110-volt A.C. circuits. During the operation of apparatus unless there is to be no spacing of the glass sheets to be cut, the motor M3 operates continuously. The control for the spacing operation will be described later.

To operate hydraulic motor 156 there is a hydraulic pump (not shown) driven by a motor (not shown) which is operated by means of a starter coil 4M. Normally closed overload contacts OL are in series with coils 1M, 3M and 4M and coil BC for the protection of the motors as is well known.

In parallel circuits are coils 1CR through 64CR of relays and these coils are used to program or determine those cutter assemblies 180 to be used for the scoring operation as well as to control the later sequence of operation for the snapping and spacing of the glass sheets produced from original glass sheet G. In series with each of the coils 1CR through 64CR is a normally open push-button switch. These push-button switches are designated 1PB through 64PB with switch 1PB being in series with coil 1CR, switch 2PB being in series with coil 2CR, etc. Of course, the switch 64PB is in series with coil 64CR. The coils 1CR through 64CR are in series also with normally open contacts 1CR–1 through 64CR–1, respectively, in holding circuits parallel to switches 1PB through 64PB, respectively. For example, when push-buttom switch 2PB is closed momentarily to energize coil 2CR this closes contact 2CR–1 of its holding circuit so that, upon opening of switch 2PB, coil 2CR remains energized until the cutting program is cancelled as explained later.

Each of the relays containing coils 1CR through 64CR has a number of contacts. As mentioned above, each cutter assembly 180 has a solenoid. These solenoids are solenoids 1SOL through 64SOL. Each of these solenoids is operatively connected to a solenoid-operated means for the corresponding cutter wheel 196 so that with the energization of the solenoid the solenoid-operated means provides downward movement of the cutter wheel 196 of a cutter assembly 180 to scoring position where wheel 196 provides a score line across glass sheet G during movement of carriage 36 away from its first position and towards its second position.

Each of coils 1CR through 64CR is in a circuit, These circuits along with one contact designated 1CR–4 through 64CR–4 of each of the relays having coils 1CR through 64CR constitute part of a settable control means to energize the solenoids mentioned above so that the pattern of energization of some of solenoids 1SOL through 64SOL corresponds to a pattern of energization of some of the relays having coils 1CR through 64CR. The apparatus includes a motor 105 to move in sequential steps an increasing number of pads 111 on chains 97. The pads 111 constitutes sets of sheet supports of sheet spacing means with each set being between table sections 42 through 47. The motor 105 moves an increasing number of these sheet supports in these sets upwardly above the top surface of table 38 and longitudinally to lift and to move laterally any glass sheet G above the sheet supports being moved. The settable control means to energize some of the solenoids 1SOL through 64SOL in a pattern further includes other contacts designated 1CR–2 through 64CR–2 of the relays having coils 1CR through 64CR and these contacts are connected to different segments of a commutator switch, described in detail later. The commutator bar is connected to other relays by brushes so that the program indicated by the state of energization or denergization of coils 1CR through 64CR determines the stopping position of the brushes during their movement afforded by the motor 105 that moves the increasing number of sheet supports to the sheet-lifting position. The motor 105 moves the sheet supports for the lifting and lateral movement of any glass sheet above the sheet supports and also moves the brushes with respect to the commutator bar segments. Thus, the relays containing coils 1CR through 64CR and some of their contacts comprise part of settable control means to energize some of solenoids 1SOL through 64SOL in a pattern related to the pattern of energization of those solenoids.

The circuitry has two parallel circuits which are alternatively connected to the 110-volt A.C. source by switch 67SW. One of these circuits has a coil 67CR of a relay and the other has a coil 68CR of a relay. When the switch 67SW is in the position to energize coil 67CR, as shown in FIG. 21A, there is provided a selective cutting operation in which carriage 36 stops after the alignment of glass sheet G at slow speed. The operator selects a new program of cutting, if desired, and in any event then restarts the movement of carriage 36 at the high speed by momentarily pressing on the button of normally open push-button switch 87PB. When switch 67SW is positioned to energize coil 68CR, there is provided a cordwood cutting operation as described later. The cutting program is automatically repeated. In this operation carriage 36 moves at slow speed for alignment of sheet G as in the selective cutting operation, but at the completion of the alignment carriage 36 automatically continues to move with change to high speed of carriage 36 for movement of cutter wheels 96 across sheet G.

In another circuit there is a coil 70CR of a relay in series with a normally closed push-button switch 70–1PB and a nornally open push-button switch 70–2PB. To energize coil 70CR an operator momentarily closes switch 70–2PB. This closes a normally open contact 70CR–2 in parallel with switch 70–2PB and in series with switch 70–1PB and coil 70CR to continue energization of coil 70CR. During the use of the apparatus coil 70CR is always energized. When for any reason an operator wishes to deenergize coil 70CR, he momentarily opens switch 70–1PB to open the holding circuit containing contact 70CR–2. To reenergize coil 70CR the operator merely momentarily closes switch 70–2PB.

In series with coil 1M, that is energized to operate the motor M1 as explained above, is a normally open contact 70CR. When coil 70CR–1 is energized this contact 70CR–1 is closed. In series with coil 1M is also a normally closed contact BC–1 of a relay having a coil BC. In series with coil BC is a normally closed contact 1M–4. Thus, when the motor M1 is started by the closing of contacts 1M–1, 1M–2, 1M–3 of the energization of coil 1M, contact 1M–4 in series with coil BC opens to prevent the energization of coil BC. Likewise when coil BC is energized for a short period, as described below, it opens contact BC in series with coil 1M–4 to deenergize the latter.

In addition to time delay relay 1TR, mentioned above, circuitry is provided with time delay relays in various parallel circuits. Two of these relays have 2TR and 3TR in parallel circuits. The relay having coil 2TR is of the on delay type and is set for two seconds. It is in series with a normally closed contact 71CR–2 that is opened by energization of a coil 71CR of a relay when a glass sheet is in the apparatus for the cutting operation as described later. Also in series with coil 2TR and normally closed contact 71CR–2 is a normally open contact 1M–5 which is also in series with the parallel circuit containing coil 3TR of a relay of the off delay type.

When contact 1M–5 in series with coils 2TR and 3TR is closed by the energization of coil 1M to operate motor M1, coil 3TR is energized to close normally open contact 3TR–1 in series with coil BC and normally closed, but now open, contact 1M–4. When coil 1M is deenergized, this closes contact 1M–4 in series with contact 3TR–1 and coil BC. Also this opens contact 1M–5 in series with coil 3TR to deenergize the latter thereby after a delay opening contact 3TR–1 in series with coil BC. The contact 3TR–1 remains closed for a sufficient period to brake motor M1 by energizing coil BC which closes the pair of contacts BC–2 and BC–3 in the 150-volt D.C. lines to motor M1. During the braking period coil BC opens a normally closed contact BC–1 in series with coil 1M to prevent energization of the latter. When contact 3TR–1 opens, coil BC–1 is deenergized. This closes contact BC in series with coil 1M, but the latter is not reenergized to restart the drive for belts 58 for the reason presented later.

The energization of coil 1M closes contact 1M–5 in series with normally closed contact 71CR–2 and coil 2TR. Thus when motor M1 is operating, coil 2TR is energized if contact 71CR–2 is closed, i.e., if there is no glass in the cutting position. The relay having coil 2TR is used to control the operation of a motor for a feeding conveyor by its contacts (not shown).

Another parallel circuit has a coil 4TR of a relay of the off delay type which is set for 0.5 second. Coil 4TR is in series with switch 4LS mentioned above. When the spaced smaller glass sheets cut from glass sheet G by the apparatus move from the cutting apparatus to the receiving conveyor, the sheets close switch 4LS. The switch 4LS opens as the trailing edge of each sheet passes beyond because of the space between sheets. However, the next sheet of the group closes switch 4LS before the relay having coil 4TR times out. Thus coil 4TR is not deenergized by the opening of switch 4LS for this short period. Coil 4TR is only deenergized after the trailing edge of the last sheet of the group passes beyond switch 4LS so that it can return to its normally open position. An operator can energize coil 4TR by pressing on the button of a push-button switch 4TR–PB in parallel with switch 4LS and in series with coil 4TR.

A coil 72CR of a relay is in a parallel circuit with a normally closed contact 4TR–1 of the off delay type. When the glass sheets are ready to be moved from the cutting position of the apparatus, coil 72CR is energized as explained later. The energization of coil 72CR closes a normally open contact 72CR–2 in series with a coil 74CR of a relay. The energization of coil 74CR opens a normally closed contact 74CR–1 in series with coil 1M. A normally open contact 11TR–2 of a relay 11TR is in series with normally closed contact 74CR–1, so that the closing of contact 74CR–1 will not energize coil 1M except when receiving conveyor 32 is in condition to receive the smaller glass sheets as described later.

In the other parallel circuits that contain time delay relays, the relays are of the electronic on delay type. These relays are designated 5TR, 6TR, 7TR and 11TR and they are set for on delay periods of 0.15, 0.35, 0.25 and 0.8 second, respectively.

The relay 11TR is in series with a normally open contact 73CR–2 and normally closed contact 73–1LS of limit switch 73LS. A coil 73CR of a relay is in series with normally open contact 73–2LS of limit switch 73LS. A contact 73CR–1 is in a holding circuit for coil 73CR and thus is in parallel with contact 73–2LS. Also in series with coil 73CR–1 and contact 73CR or contact 73–2LS is a normally closed contact 74CR–2. When glass sheet G is being moved from feeding conveyor 31 to the cutting position of the apparatus, sheet G trips limit switch 73LS opening contact 73–1LS and closing contact 73–2LS. The closing of contact 73–2LS energizes coil 73CR. The contact 73CR–2 in series with relay 11TR also closes. When the trailing edge of sheet G passes limit switch 73LS, contact 73–2LS opens, but coil 73CR remains energized because of now closed contact 73CR–1 in its holding circuit. After the trailing edge of the glass sheet passes limit switch 73LS, contact 73–1LS closes and current flows through it and closed contact 73CR–2 to relay 11TR. After 0.8 second delay set for relay 11TR, a normally open contact 11TR–1, which is of the on delay type in series with coil 71CR will start to close. When contact 11TR–1 closes, coil 71CR is energized and this opens contact 71CR–2 to deenergize coil 2TR.

Until relay 11TR is deenergized, contact 11TR–1 keeps coil 71CR energized, thereby keeping coil 2TR deenergized so as to prevent the operation of feeding conveyor 31 that would otherwise move another glass sheet G on to belts 58.

When the coil 71CR is energized by the closing after a delay of contact 11TR–1 as described above, the normally closed contact 71CR–1 in series with coil 1M opens. Also normally open contact 11TR–2 of the on delay type opens after the delay. As a result coil 1M is deenergized. This results in the opening of contacts 1M–1, 1M–2, 1M–3 between the power source and motor M1. In parallel with contact 11TR–2 is a normally open manual switch 1SW for the reason described later. Contact 11TR–2 remains open until it is closed during the restoring operation described later, in which coil 72CR is energized so that coil 1M is not energized by the closing of contact 11TR–2 until conveyor 32 can receive the glass sheets. Thus the deenergization of coil 1M continues after the closing of contact BC–1 in series with it.

Thus it is seen that the passage of the trailing edge of the glass sheet beyond limit switch 73LS starts a chain of events through the circuitry to denergize coil 1M and energize coil BC to stop motor M1. The time from the passage of the trailing edge of the glass sheet over limit switch 73LS to the stopping of motor M1 is sufficiently controlled for accurate positioning or indexing of the trailing edge of the glass sheet for the subsequent cutting operations.

The contact 1M–5, in series with coil 2TR, closes when coil 1M is energized to move glass sheets to conveyor 32, but contact 71CR–2 remains open to prevent energization of coil 2TR until shortly after the first of glass sheets cut from sheet G closes limit switch 4LS to energize coil 4TR. The energization of coil 4TR closes contact 4TR–2 to energize coil 74CR. This opens a normally closed contact 74CR–2 in series with and thus deenergizes coil 73CR, which had been energized when the previous glass sheet that was fed to belts 58 closed contact 73–2LS and contact 73CR–1 held it energized. When coil 73CR–2 drops out, it opens contact 73CR. This drops out relay 11TR to open contact 11TR–1 thereby deenergizing coil 71CR–2. When this occurs, contact 71CR closes to energize coil 2TR so that conveyor 31 starts operation.

The solenoids 1SOL through 64SOL are in parallel circuits. Each solenoid is part of one of the cutter assemblies 180. Each of these solenoids is in series with a normally open contact. For example, solenoid 1SOL is in series with a contact 1CR–4 and solenoid 64SOL is in series with a contact 64CR–4. To energize any one of these solenoids an operator must energize one of coils 1CR through 64CR of relays in parallel circuits. For example, by normally closing push-button switch 1PB in series with coil 1CR, the latter is energized to close a normally open contact 1CR–1 of its holding circuit. The energization of coil 1CR–4 closes contact 1CR in series with solenoid 1SOL. This unlatches plate 190 of the corresponding cutter assembly 180 as described above.

Each of stepping switches SS1–L, SS2–L and SS3–L (FIGS. 21E and 23) is provided with seven levels of banks of contacts. Stepping switch SS1–L has two levels designated L5 and L6 (FIG. 21E). Each contact of these banks is connected to a coil of a solenoid valve. Similarly, the fifth and sixth levels of switches SS2–L and SS3–L are designated L5 and L6 for each switch (FIG. 21E). The contacts of these banks, except for two contacts of L6 of switch SS3–L, are similarly connected to coils of solenoid valves. These valves are solenoid valves 1SV through 64SV of snapping devices 280. The coils of these solenoid valves are also designated 1SV through 64SV. The coils 1SV through 64SV are connected to the contacts of these banks of the levels of the stepping switches so that, when SS1–L, SS2–L and SS3–L operate in sequence with the wiper for level 5 of each stepping along the bank of contacts immediately before the wiper for level 6 steps along its bank of contacts, the wipers in sequence will be in series with coils 1SV through 64SV in that order. The direction of rotation of the wipers for the fifth and sixth levels of the three stepping switches is shown in FIG. 21b.

In other parallel circuits connected to the 110-volt A.C. power source are coils 75CR, 76CR and 77CR, which are in series with normally open limit switches 75LS, 76LS and 77LS, respectively. In parallel with limit switches 75LS, 76LS and 77LS, and in series with coils 75CR, 76CR and 77CR are normally open contacts 75CR–1, 76CR–1 and 77CR–1, respectively, of holding circuits that maintain these coils energized when sheet G is raised by casters 69. The energized coils drop out at the end of the squaring operation as described later.

When glass sheet G is transferred to belts 58 from feeding conveyor 31, one or more of limit switches 75LS, 76LS and 77LS will be closed, if the glass sheet is sufficiently wide as explained above, to energize one or more of coils 75CR, 76CR and 77CR, respectively.

In parallel circuits are coils 65SV, 75SV, 76SV and 77SV of solenoid valves. These solenoid valves, when their coils are energized, operate the associated air cylinder 75 to raise the associated rows of casters 69. In series with coils 75SV, 76SV and 77SV of the solenoid valves are normally open contacts 75CR–2, 76CR–2 and 77CR–2, respectively. Thus none of the solenoid valves will be energized for raising the associated row of casters 69 unless the appropriate coil 75CR through 77CR is energized as described above. In addition, none of coils 65SV and 75SV through 77SV of the solenoid valves will be energized until a short period after belts 58 have stopped by deenergizing coil 1M for the reason discussed later.

In other parallel circuits there are coils 81CR, 82CR, 83CR, 84CR, 85CR, 87CR, 88CR, 89CR, 95CR, 96CR, 98CR and 99CR of relays.

The coil 96CR is in series with a normally closed contact 3TR–1 of the off delay type. When coil 3TR is energized during the operation of motor M1, contact 3TR–1 is open. When coil 3TR is deenergized as explained above, contact 3TR–1 after a delay closes to energize coil 96CR. This closes a normally open contact 96CR–1 in series with coils 65SV, 75SV, 76SV and 77SV of solenoid valves. Thus one or more of these coils is not energized to raise casters 69 until a delay period after the stopping of motor M1 by the deenergization of coil 1M.

The hydraulic motor 156 that drives the carriage 36 is connected by the following arrangement of valves and pipes to the hydraulic pump (not shown) which is driven by a motor operated by starter coil 4M. Fluid from the outlet of the hydraulic pump flows through a pipe and a T coupling to a pair of pipes. The pair of pipes is connected to the inlets of a four-way, spring-centered valve (not shown) having two solenoids to move its spool from center position to which it is biased by a spring. The coils of the two solenoids are designated 120–1SV and 120–2SV. When solenoid 120–1SV is energized the spool is moved to the position for pumping the fluid from the hydraulic pump to hydraulic motor 156 for forward drive of carriage 36, i.e., away from the home position. When solenoid 120–2SV is energized, the spool is moved to the other position for flow of fluid from the hydraulic pump to the hydraulic motor 156 for driving carriage 36 in the reverse direction, i.e., to the home position. Each of the pipes for pumping fluid from the hydraulic pump to the four-way valve has a portion with a reduced cross section to limit the rate of flow of the fluid for slow speed operation of carriage 36. Each of these pipes has connected to it a by-pass pipe, that is, a valved pipe that by-passes the reduced portion. The valve in each by-pass piping is spring-biased to closed position but has a solenoid with a coil which, when it is energized, allows fluid to by-pass the reduced portion of the main pipe.

As a result fluid is pumped to motor 156 for high speed movement of carriage 36. The coils in the solenoids of the by-pass valves are designated 121SV and 122SV for use in high speed drive of carriage 36 in the forward and reverse directions, respectively. Coils 120–1SV, 120–2SV, 121SV and 122SV are in parallel circuits and are in series with a manual on-off switch 120SW which must be closed for the carriage to operate. When switch 120SW is opened, neither coil 120–1SV nor coil 120–2SV can operate. As a result the spool of the four-way valve is spring biased to its center position and no fluid is pumped to hydraulic motor 156.

When glass sheet G is raised by casters 69, switch 81LS is closed as described above. Because limit switch 81LS is in series with a coil 81CR of a relay, coil 81CR is energized. The continuation energization of coil 81CR is not dependent upon switch 81LS because in a holding circuit, parallel to switch 81LS, a normally open contact 81CR–1 closes. This closes normally open contacts 81CR–2 and 81CR–3 in series with coils 120–1SV and 121SV respectively to energize these solenoids so that the carriage starts and moves forward at the fast speed. When carriage 36 at fast speed moves to the position where the roller of either of limit switches 82–1LS and 82–2LS abut sheet G and is moved by sheet G to close the limit switch, there is energized a coil 82CR of a relay in series with switches 82–1LS and 82–2LS, which are in parallel circuits. This opens a normally closed contact 82CR–1 in series with coil 121SV changing the forward movement of carriage 36 to slow speed. The coil 120–1SV remains energized.

The pusher rollers 234 of pusher assemblies 218 on the moving carriage 36 are in the down position as shown in FIGS. 14 and 15. The carriage 36 moves forwardly at the slow speed so that rollers 234 push glass sheet G toward stop members 262 which are in the raised position as shown in FIGS. 12 and 13. As soon as glass sheet G abuts stop members 262, the rollers 234 are unable to provide further movement of sheet G. However, carriage 36 continues to be moved at slow speed. As a result, rollers 234 are moved slightly to the right (from the position shown in FIG. 15) to trip limit switches 83–1LS and 83–2LS on pusher assemblies 218. If sheet G is pushed by one assembly 218 against one of stop members 262 ahead of the other, the sheet G will be pushed by the other assembly 218 until the sheet G abuts the second stop member 262. Then sheet G is in alignment or is squared as to its edge abutting members 262. These limit switches, only when both are closed because they are in series, energize a coil 83CR of a relay.

The energization of coil 83CR closes a normally open contact 83CR–1 (not shown) which is in series with a solenoid valve to operate both air cylinders 226 causing the piston rod 227 of each to extend for movement of shaft 229 from left to right (as viewed in FIG. 15) to raise rollers 234 as described above. This coil of the solenoid valve that operates cylinders 226 is in series not only with contact 83CR-1 (not shown) but is also in series with normally open contacts 88CR-1 and 95CR-1 (both not shown) which are in parallel with each other and in parallel with contact 83CR-1 (not shown), so that rollers 234 remain in the raised position until the carriage returns to its home position.

With the completion of the squaring of sheet G, the coil 83CR remains energized because of the closing of a normally open contact 83CR-1 in a holding circuit for coil 83CR and in parallel with limit switches 83-1LS and 83-2LS.

The energization of coil 83CR closes a normally open contact 83CR-3 (not shown) to operate a solenoid valve (not shown) that operates air cylinders 256 to move stop members 262 from the raised position to a lowered position. This solenoid valve remains energized, until carriage 36 returns to its home position, by the use of normally open contacts 88CR-4 and 95CR-4 (both not shown) in circuits parallel with contact 83CR-2 and in series with the coil of the solenoid valve. This circuit arrangement is the same type as described above for that used to maintain rollers 234 in their raised position until carriage 36 returns to its home position.

The energization of coil 83CR also closes a normally open contact 83CR-4 to energize a coil 83SV of a solenoid valve to operate air cylinders 290 mounted on supporting structure 30 so as to move clamping arms 170 onto the glass sheet G at the leading and trailing margins. The movement of clamping arms 170 onto glass sheet G closes limit switches 84-1LS and 84-2LS, which are in series with each other and a coil 84CR-1 of a relay and which are mounted on supporting structure 30. The coil 84CR is energized so long as arms 170 are lowered.

The energization of coil 83CR also opens a normally closed contact 83CR-5 in series with now closed, normally open contact 81CR-2 and coil 120-1SV. As a result, carriage 36 stops, if selector switch 67SW is in series with coil 67CR.

If switch 67SW is in series with coil 68CR, carriage 36 will continue to move forwardly, if arms 170 are in clamping position because in parallel with the normally closed contact 83CR-5, that opens, is a normally open contact 87CR-1 that is closed by the energization of a coil 87CR of relay. In series with coil 87CR are a normally open contact 68CR-1, that is closed when coil 68CR is energized, and a normally open contact 84CR-2 that closes when arms 170 are lowered. In series with coil 87CR is a normally open contact 85CR-1 that must be closed for forward movement of carriage 36 after the squaring operation. This occurs when casters 69 are lowered by air cylinders 75 for links 73 to close switches 85-1 through -4LS in series with a coil 85CR of a relay.

If carriage 36 stops, for the reason mentioned above, an operator has a chance to cancel the program of cutting used on the preceding sheet G by momentarily opening push-button switch 65PB in order to use a different cutting program. Switch 65PB is in series with all of the holding circuits that contain contacts 1CR-1 through 64CR-1 in series with coils 1CR through 64CR, respectively. To establish a new program of cutting, the operator then presses the appropriate push-buttons of push-button switches 1PB through 64PB. In this case to restart the drive of carriage 36 the operator then momentarily closes push-button switch 87PB to energize coil 87CR in series with it and now closed contact 84CR-2. The coil 87CR remains energized because of a holding circuit with a normally open contact 87CR-2 that is in parallel with push-button switch 87PB. The energization of coil 87CR closes a normally open contact 87CR-1 in series with solenoid valve 120-1SV and in parallel with now open contact 83CR-5. This energizes coil 120-1SV to restart carriage 36 in the forward direction. Because there is also closing of a normally open contact 87CR-3 in parallel with contact 82CR-1 and in series with coil 121SV, the forward drive is at the fast speed.

The energization of one or more of coils 1CR through 64CR closes contacts 1CR-4 through 64CR-4, respectively, in series with solenoids 1SOL through 64SOL, respectively, but in series with all is a normally open contact 87CR-4. As a result none of the cutters is dropped in the selective cutting operation by energizing one of solenoids 1SOL through 64SOL after squaring until coil 87CR is energized by the operator closing switch 87PB. In parallel with switch 87PB is a holding circuit with contact 87CR-2. In the case of cordwood cutting the appropriate solenoids are energized by energizing coil 87CR automatically when contact 84CR-2 closes upon the lowering of arms 170.

Because the energization of any one of solenoids 1SOL through 64SOL is dependent on whether or not the contact, of contacts 1CR-4 through 64CR-4, in series with it is open or closed and is dependent also on whether or not contact 87CR-4 in series with all of solenoids 1SOL through 64SOL is closed, the relays having coils 1CR through 64CR and the relay having coil 87CR constitute relay means to actuate at least some of solenoids 1SOL through 64SOL which constitute part of the relay-actuated means separately and operatively associated with cutter wheels 196 to retain wheels 196 in the raised position, as described earlier. Of course, the actuation of any one of solenoids 1SOL through 64SOL results in the lowering of associated cutter wheel 196.

Figure 23:
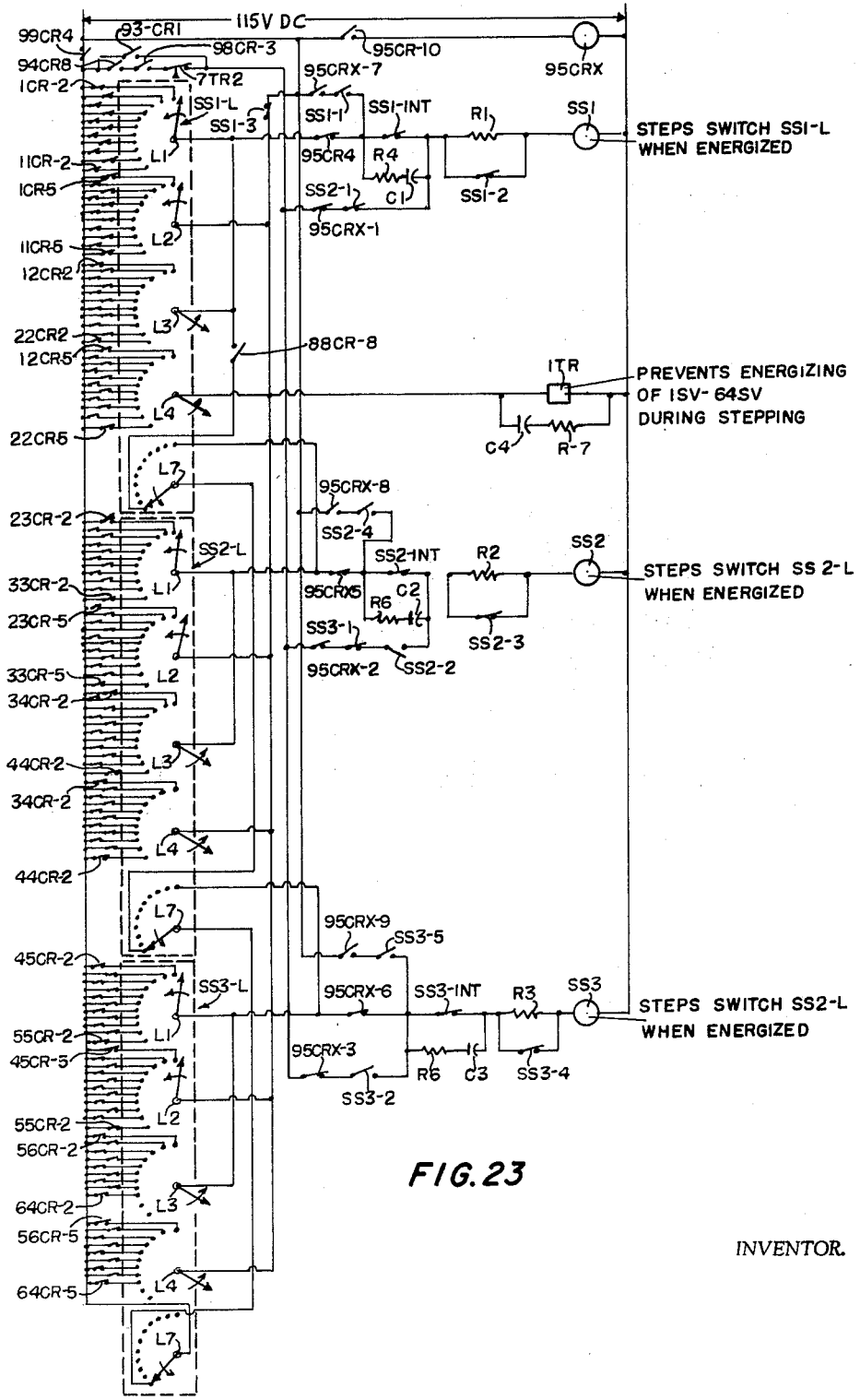

As mentioned earlier, the solenoid valves 1SV through 64SV comprise part of relay-actuated means associated with snapping heads 282 which are located in alignment with score lines made by cutter wheels 196. The relays having coils 1CR through 64CR have contacts 1CR-2 through 64CR-2 associated with stepping switches as shown in FIG. 23 and the state of energization of coils 1CR through 64CR of these relays determines the sequential operation of the stepping switches when carriage 36 is at its second position to energize coil 88CR. Thus, the state of energization of coils 1CR through 64CR determines the sequential operation of the three stepping switches and this sequential operation determines the sequential controlled or programmed energization of some of the solenoids 1SV through 64SV with the cooperation of relays 1TR, 5TR and 6TR. The latter relays are also part of the relay means to actuate in sequence, with carriage 88 at the second position for the tripping closed of switch 88LS, only those relay-actuated means including the corresponding solenoid valves, of solenoid valves 1SV through 64SV, associated with snapping heads 282 below the score lines made by cutter wheels 196. These wheels 196 have been lowered by the actuation of the relay-actuated means that include those solenoids, of solenoids 1SV through 64SV, that are energized by the associated coils, of coils 1CR through 64CR.

With the clamping of glass sheet G onto crowned table 38 by arms 170, and carriage 36 moving at fast speed, the cutter assemblies 180 move over the glass sheet G. The plate 190 of one or more of cutter assemblies 180 have been unlatched by energization of one of solenoids 1SOL through 64SOL, as described above, so that the appropriate roller or rollers 213 can ride up over the edge of sheet G as indicated in FIG. 17. As carriage 36 moves across sheet G, cutter wheels 196 associated with rollers 213 that ride up the edge of sheet G are lowered into contact with sheet G and produce score lines.

The carriage 36 moves across and beyond sheet G at the fast speed until cam rail 270 opens limit switch 121LS, as described above. Because switch 121LS is in series with coil 121SV, the latter is deenergized. The carriage 36 continues to move but at the slow speed until it hits stop members 133 when carriage 36 closes a limit switch 88LS monuted on the supporting structure 39 and in series with a coil 88CR of a relay so that coil 88CR is energized. This opens a normally closed contact 88CR-5 in series with the holding circuit of coil 81CR to deenergize the latter. This opens contact 81CR-2 in series with coil 120–1SV but the energization of the latter is continued because in parallel with contact 81CR–2 is a normally open contact 88CR–6 that closes with the energization of coil 88CR. Thus the slow speed forward drive of motor 156 remains to maintain carriage 36 in abutment with the stop members 133 for the subsequent operations of snapping and spacing.

When coil 88CR is energized this opens a normally closed contact 88CR–7 in series with the holding circuit for coil 83CR. This deenergizes coil 83CR thereby opening contact 83CR–4 in series with coil 83SV of the solenoid spring-biased valve for cylinders 290. The deenergization of coil 83SV causes the solenoid valve to operate cylinders 290 in the reverse direction to raise clamping arms 170.

The energization of coil 88CR closes a normally open contact 88CR–8 in series with a coil SS1 of a relay for stepping switch SS1L. Also in series with this contact 88CR–8 are levels 7 of the three stepping switches, and these levels are designated L7 for each of SS1–L, SS2–L and SS3–L with contact 88CR–8 between them and coil SS1 and with level L7 of switch SS2–L between levels L7 of switches SS1–L and SS2–L. When the three stepping switches are in their home positions, as indicated in FIG. 23, the wipers for levels L7 are in contact with the last contact of the bank of each. As seen in FIG. 23, the wiper of L7 of switch SS1–L is connected to the last contact of the bank of contacts of L7 of switch SS2–L, and wiper of L7 of switch SS2–L is connected to the last contact of the bank of contacts of level L7 of switch SS3–L. The wiper of level L7 of switch SS3–L is connected to one of the lines to the 115-volt D.C. source. As a result, when contact 88CR–8 closes, current passes through levels L7 of the three stepping switches to coil SS1–L. This steps switch SS1. The wiper of level L7 of switch SS1–L steps off the last contact of the banks of contacts of level L7. Current can no longer flow through levels L7 of the three stepping switches to maintain energization of coil SS1.

With the stepping of switch SS1–L the wiper of level L1 steps to the first contact of that level of bank of contacts as does the wiper of level L2. The first contact of the bank of contacts of level L1 of stepping switch SS1–L is connected to one of the main lines to the power source through a normally closed contact 1CR–2. Likewise, the first contact of level L2 of stepping switch SS1–L is connected to one of the main lines through a normally closed contact 1CR–5. Of course, the same contact can be used, but to reduce the crossing of lines, if using only one each of contacts 1CR–2 and 1CR–5 through 64CR–2 and 64CR–5, respectively, separate contacts are shown in FIG. 23. The various levels of bank of contacts of the three stepping switches have 11 contacts for each bank. For levels L1 and L3 of stepping switch SS1–L, the contacts of the banks are connected to the main line through normally closed contacts 1CR–2 through 22CR–2 so that, as switch SS1–L steps in the direction indicated by the arrows for the wipers of levels L1 and L3, the wiper L1 steps through the contacts connected through normally closed contacts 1CR–2 through 11CR–2, and when wiper for level L1 steps off the last contact of the bank, the wiper of level L3 steps to the first contact of its bank which is in series with normally closed contact 12CR–2. Then the wiper for level L3 steps through the contacts which are in series with contacts 13CR–2 through 22CR–2. During this operation of switch SS1–L the wipers for levels L2 and L4 in sequence step through their bank of contacts which are in series with contacts 1CR–5 through 11CR–5 and 12CR–5 through 22CR–5, respectively.

When the wipers for levels L2 and L4 step from the last contact of their banks of contacts, the wipers for level L7 is stepped to the first contact of its bank of contacts. With the circuit arrangement there is no longer any possibility of energizing coil SS1 through levels L1 or L3 of stepping switch SS1–L because the wipers of levels L1 and L3 are now in the positions indicated in FIG. 23. However, the first contact of the bank of contacts of level L7 of switch SS1–L is in series with a coil SS2 of a relay for the operation of stepping switch SS2–L. As a result current now flows through the levels L7 of stepping switches SS3–L, SS2–L and SS1–L to energize coil SS2–L. This operates stepping switch SS2 so that the wiper of level L7 of switch SS2–L is stepped away from the last contact of the bank of contacts of that level. Accordingly, even though the wiper of level L7 of switch SS3–L remains in contact with the first contact of the bank of that level, current can no longer flow by this route to energize coil SS2. However, this first step of switch SS2–L moves the wiper of level L1 of switch SS2–L to the contact that is in series with a normally closed contact 23CR–2. With further stepping of switch SS2–L the wiper of level L1 steps in sequence to the other contact of the bank which are in series with normally closed contacts 24CR–2 through 33CR–2. Likewise, the wiper of level L2 of switch SS2–L is stepped through the bank of contacts that are in series with normally closed contacts 23CR–5 through 33CR–5. With further stepping of switch SS2–L the wipers of levels L1 and L2 step away from the last contact of each which is in series with contacts 33CR–5. When this occurs the wipers of levels L3 and L4 are stepped into contact with the first of the bank of contacts of those levels of switch SS2–L. The banks of contacts of levels L3 and L4 are each in series with contacts 34CR–2 through 44CR–2 and 34CR–5 through 44CR–R as shown in FIG. 23.

When the stepping switch SS2–L operates to move the wipers of its levels L3 and L4 from the banks of contacts of these levels, the wiper of its level L7 is stepped into contact with the first of the bank of contacts of that level. This contact of the bank is in series with a coil SS3 of a relay that operates stepping switch SS31L. The operation of stepping switch SS2–L ceases so that the wiper of its level L7 remains in this position. The first stepping operation of switch SS3–L moves the wiper of level L7 of switch SS3–L away from the last contact of the bank of contacts of that level so the current cannot continue to flow through the wipers of levels L7 of switches SS3–L and SS2–L to coil SS3. However, the wipers of levels L1 and L2 of switch SS3–L are stepped by this short energization of coil SS3 to contact with the first contact of the bank of contacts of these levels.

The banks of contacts of levels L1 and L2 are in series with normally closed contacts 45CR–2 through 55CR–2 and 45CR–5 through 55CR–5 respectively connected to one of the main lines to the 115-volt D.C. source. Likewise, the first nine contacts of each of the banks of contacts of levels L3 and L4 of stepping switch SS3–L are in series with normally closed contacts 56CR–2 through 64CR–2 and 56CR–5 through 64CR–R respectively connected to one of the main lines to the 115-volt D.C. source. When the wipers of levels L1 and L2 of switch SS3–L step away from the associated banks of contacts, the wipers of levels L3 and L4 of switch SS3–L are stepped to the first contact of the banks of contacts associated with them and continue to step through the bank until each of them has stepped from the contact of the bank that is in series with normally closed contact 64CR–2 and 6ACR–5 respectively.

In order for the switches SS1–L, SS2–L and SS3–L to step in sequence, as in the manner indicated above, an interrupter switch is in series with each of the coils SS1, SS2 and SS3 between the coil and the wipers of levels L1 and L3 of the switch. These interrupter switches are normally closed and are designated SS1–Int, SS2–Int, and SS3–Int. The wipers of levels L1 and L3 of each stepping switch are in parallel with each other, but, of course, both are in series with the appropriate interrupter switch and the appropriate coil of the relay of the stepping switch. The use of an interrupter switch for moving the wiper of a stepping switch from a hot contact of the bank of contacts of that level is well known in the art of stepping switches.

If none of coils 1CR through 64CR is energized, all of the contacts 1CR-2 through 64CR-2 and 1CR-5 through 64CR-5 in series with the banks of contacts of levels L1 and L3 of switches SS1-L, SS2-L and SS3-L are in their normally closed condition. Then the stepping switches would operate in sequence, as described above, because each wiper of a stepping switch meets a contact which is energized, i.e., electrically hot, until wiper L3 of switch SS3-L steps to the next contact beyond the contact in series with contact 64CR-2. When a wiper L1 or L3 of one of the switches is stepped to an energized contact, current flows to the coil of the relay of the stepping switch. The interrupter switch opens the circuit causing the stepping of wiper L1 or L3 of that switch.

When one of the wipers of levels L1 and L3 of any of the three stepping switches is stepped to a contact in series with one of contacts 1CR-2 through 64CR-2 or 1CR-5 through 64CR-5, that is open because of the energization of one of coils 1CR through 64CR, associated with it, that stepping switch stops. The stepping switch will not restart operating until a snapping and spacing operation has occured, as described later.

The wipers of levels L2 and L4 of each of stepping switches SS1-L, SS2-L and SS3-L are connected in parallel with each other and in series with a coil 1TR of a time delay relay. A contact SS1-3 of stepping switch SS1-L is also in series with coil 1TR and in parallel with the wipers of levels L2 and L4. This contact SS1-3 is closed when switch SS1-L is in its home position where the wipers are positioned as shown in FIG. 23 and is open when the stepping switch is at all other positions of its operation. Thus coil 1TR is energized through this contact SS1-3 until stepping switch SS1-L moves from its home position. Then the continued energization is dependent upon the wipers of levels L2 and L4 of switches SS1-L, SS2-L and SS3-L being moved in sequence to energized contacts of the banks of contacts of these levels. When anyone of these stepping switches is stopped, it is because one of the wipers of levels L1 and L3 is a nonenergized contact as described above. The wipers, L1 or L3, is also at that time in contact with a nonenergized contact of one of the banks that is in series with an open one of contacts 1CR-2 through 64CR-2 or 1CR-5 through 64CR-5. This deenergizes coil 1TR.

The deenergization of coil 1TR closes a normally closed contact 1TR-1 in series with time delay relay 5TR (FIG. 21B) to energize the latter. This closes normally open contacts 5TR-1 of the on delay type in series with time delay relay 6TR and 5TR-2 in series with a normally closed contact 6TR-1 of the on delay type and the wipers of levels L5 and L6 of switches SS1-L, SS2-L and SS3-L. Although both contacts 5TR-1 and 5TR-2 close about the same time, contact 6TR-1 remains closed for a brief period of time. This energizes all wipers of levels L5 and L6 for that period of time whenever relay 1TR is deenergized. If one of these six wipers is in contact with one of the contacts of its corresponding bank of contacts of that level, the contact is energized and so is the coil (one of 1SV through 64SV) in series with it. Let us assume only coil 2CR of coils 1CR through 64CR is energized for the program of cutting. The stepping switch SS1-L stops when the wiper of level L1 engages the nonenergized contact in series with open, normally closed contact 2CR-2. Relay 1TR deenergizes thereby energizing wipers of levels L5 and L6 of the stepping switches. The wiper of level L5 of switch SS1-L engages the contact of the bank of that level that is in series with coil 2SV. This energizes coil 2SV for a brief period of time after which contact 6TR-1 opens.

It is seen in FIG. 21B that the banks of contacts of levels L5 and L6 of switches SS1-L, SS2-L and SS3-L are in series with coils 1SV through 64SV. The energization of one of coils 1SV through 64SV, for example, coil 2SV, operates its associated hydraulic cylinder 281 to move snapping head 282 on its piston rod up against the underside of the glass sheet G to raise it slightly, i.e., up against the two moment devices 162 that are opposite sides of the score line above raised head 281. The heads 169 on devices 162 prevent further raising of glass sheet G with the result that sheet G is snapped along this score line, i.e., the cut is run. As soon as contact 6TR-1 opens, the wipers of levels L5 and L6 of the stepping switches are deenergized. This deenergizes coil 2SV. The spool of the spring-biased, four-way valve operated by solenoid 2SV returns to the other position whereby oil is fed to cylinder 281 to retract snapping head 282. At the same time a normally open contact 6TR-2 of the on delay type in series with a coil 98CR of a relay closes. This energizes coil 98CR to close a normally open contact 98CR-1 in series with this contact 6TR-2 and a coil 98SV of a solenoid valve. This operates the valve so that it no longer bleeds fluid from the main pipe connecting a source of fluid under pressure to cylinder 281. This provides a higher fluid pressure to cylinder 281 for fast retraction of the snapping head 281.

The energization of the coil 98CR also closes a normally open contact 98CR-2 in series with relay 7TR (FIG. 21B) and, after its delay, it closes a normally open contact 7TR-1 of the on delay type which is in series with a coil 89CR of a relay. This energizes coil 89CR to close a normally open contact 89CR-1 in series with a coil 92CR (FIG. 21C) of a relay.

The energization of coil 92CR closes a normally open contact 92CR-1 (FIG. 22) in series with a coil 92MC to energize the electric clutch of coupling 129 so that motor M3 rotates shafts 108 through a revolution to lift pads 111 on chains 97 as described above. Before electric clutch of coupling 129 operates by energization of coil 92MC, chains 97 are driven from the previous position for spacing to the proper position for spacing, i.e., with the leading pad 111 of each chain 97 to the left, as viewed in FIG. 9 of the score line that is most recently snapped and now ready for the spacing operation. The proper positioning of pads 111 by the movement of chains 97 is described later.

Two other parallel circuits are provided, one with a coil 90CR of a relay and the other with a coil 91CR of a relay. As seen in FIG. 21C, coil 90CR is connected through a normally closed 97CR-1 to a brush contact BR1 and coil 91CR is connected to five brushes BR2, BR3, BR4, BR5, and BR6 of a commutator switch generally indicated at 300. The commutator switch has a commutator bar comprised of commutator segments CS1 through CS72 each insulated from one another as is well known in the commutator art. The brushes BR2, BR3, BR4, BR5, and BR6 connected to coil 91CR are at any moment positioned to touch five adjacent commutator segments CS3 through CS7. The BR1 connected to coil 91CR is positioned to touch a segment CS1 that is spaced by one commutator segment CS2 from the set being touched by brush BR6 connected to coil 91CR. A shaft 200 rotated about axis $x$ containing the brushes BR1 through BR6.

The motor 105 is driven by fluid fed through a solenoid spring-biased, four-way valve (not shown), piping with a portion having a restricted cross section and a solenoid spring-biased valve in a by-pass piping. The fluid under pressure is provided by the continuously operated hydraulic pump (not shown) driven by the motor (not shown) operated by coil 4M. The four-way valve of the main piping is opened by the energization of a coil 90SV of its solenoid. The valve in the by-pass piping is open when a coil 91SV of its solenoid is energized. When coil 90SV is energized, motor 105 moves chains 97 at slow speed. When both coils 90SV and 91SV are energized, motor 105 moves chains 97 at fast speed.

The coils 90SV and 91SV are in parallel with each other but are in series with a normally closed contact 90CR-1. In series with coil 91SV between it and contact 90CR-1 are a normally open contact 10TR-1 of the on delay type and a normally closed contact 91CR-1. A cam CC-1 located on the driven shaft 95 and connected to shaft 200 of the commutator switch 300 as shown diagrammatically in FIG. 210 is constructed so that it will open a normally closed limit switch 90LS during part of each complete rotation of the shaft of the commutator switch 300. The commutator switch in this preferred embodiment has 72 commutator segments CS1 through CS72. Each one of the first 64 commutator segments CS1 through CS64 is electrically connected with one of normally open contacts 1CR-3 through 64CR-3, which are in parallel circuits. The contacts 2CR-3 through 64CR-3 are in series with two normally closed contacts 94CR-1 and 95CR-3 to be referred to later. The contact 1CR-3 and the circuits containing the contacts 2CR-3 through 63CR-3 that are in series with contacts 94CR-1 and 95CR-3 are all in series with limit switch 90LS.

In parallel with contact 1CR-3, but in series with limit switch 90LS and the first segment CS1 of the commutator bar is a normally closed contact 88CR-9, and as a result, when the switch 300 is in its home position, the first segment CS1 of the commutator switch is energized. This energizes coil 90CR keeping open contact 90CR-1 in series with coils 90SV and 91SV. This prevents the operation of chains 97 so long as commutator switch is in the home position.

When carriage 36 reaches the snapping position, coil 88CR is deenergized as mentioned above. The contact 88CR-9 opens to deenergize coil 90CR. This closes contact 90CR-1 to energize coil 90SV to drive the chains. This moves brush BR1 the first brush of the commutator switch off the commutator segment CS1. However, if normally open contact 1CR-3 is not closed, the first spacing will occur, after snapping, without any previous movement of chains 97 from their home position. This condition occurs in the preferred operation for the cutting of the glass sheet in which it is desirable to take a one-inch trim of the leading edge of sheet G. For this reason an operator momentarily closes pushbutton switch 1PB when setting up the cutting program. This energizes coil 1CR to close contact 1CR-3 in series with the first segment CS1 of the bar of the commutator switch. In this event chains 97 do not move until the snap of the one-inch trim has been made and the trim glass sheet has been spaced from the balance of the glass sheet, as described below.

A cam EC-1 is mounted on one of shafts 103 for the eccentric drive for the movement of plates 92 for the spacing operation. The cam EC-1 keeps a normally closed limit switch 97LS in open position except for a moment when cam EC-1 has rotated about 270 degrees during its single revolution for a spacing operation. A normally closed contact 9TR-1 of the on delay type and a coil 97CR of a relay are in series with switch 97LS. When limit switch 97LS momentarily closes, it energizes coil 97CR-1 to open a normally closed contact 97CR in series with coil 90CR. This deenergizes coil 90CR to close a contact 90CR-1 in series with solenoid 90SV so that the movement of the chains begins at the slow speed.

If the program included the energization of coil 2CR for cutting, with the commutator switch shaft 200 moving only at slow speed, brush BR1 in series with coil 90CR next engages segment CS2 of commutator bar 301 which is connected to be energized because contact 2CR-3 in series with it closes. However, contact 9TR-1 has opened to deenergize coil 97CR, even though a normally open contact 97CR-2 in a holding circuit closes when coil 97CR is energized because this contact 97CR-2 and contact 9TR-1 are in series. This closes contact 97CR in series with coil 90CR. As a result, through segment CS2 of commutator bar, coil 90CR is energized, thereby opening contact 90CR-1 to deenergize solenoid 90SV, and chains 97 stop. With coil 90CR thus energized through now-closed contact 2CR-3, chains 97 remain stopped until limit switch 97LS is again momentarily closed near the end of the eccentric drive for the spacing operation to deenergize coil 97CR again. The drive for chains 97 starts again.

The brushes are again moved into sequential contact with the various segment of the bar of the commutator switch. At first, only coil 90SV is energized so that the drive for chains 97 first operates at slow speed. At the time that coil 90SV is energized, relay 10TR is also initiated, and at the end of its set period, it starts to close contact 10TR-1. After a brief period, contact 10TR-1 closes, thereby energizing coil 91SV so that the drive for chains 97 changes to the fast speed.

Assuming that the program of cutting required the energization of coil 48CR (not shown) with no energization of coils 3CR through 47CR, brush BR6 in series with coil 91CR next meets segments CS48 of bar that is in series with now-closed contact 48CR-3 (not shown). This results in energization of coil 91CR. The contact 91CR-1 opens to deenergize coil 91SV so that the drive for chains 97 reverts to slow speed. The other brushes engage in sequence with closed contact 48CR thereby maintaining 91CR energized. Furthermore, coil 91CR has a holding circuit that includes a normally open contact 91CR-2 and a normally closed contact 90CR in series. This circuit keeps coil 91CR energized until coil 90CR is energized. When the segment CS48 in series with contact 48CR-3 is contacted by brush BR1 connected to coil 90CR, the latter is energized. This opens the contact 90CR-1 in series with coil 90SV and with relay 10TR to deenergize both of them. With coil 90SV deenergized the drive for chains 97 stops. With coil 90CR energized, contacts 90CR-2 in the holding circuit for 91CR opens. Also a normally closed contact 90CR-3 in series with coil 91CR and brushes BR2 through BR6 opens. Thus coil 91CR cannot be energized even if one of the sets of brushes is in segment with an energized contact of commutator bar. This prevents start up of the chain drive at fast speed when switch 97LS is closed near the end of the next spacing operation. With relay 10TR deenergized, this opens contact 10TR-1 in series with coil 91SV. The contact 10TR-1 is not closed immediately upon the closing of contact 90CR in series with relay 10TR. It is closed only after chains 97 start to be driven at the slow speed as described above.

After the snapping and spacing operations, the drive for chains 97 is started again as described above by switch 97LS closing momentarily. Assuming that there is no further snapping and spacing to be accomplished, chains 97 are driven at fast speed until all of the brushes have passed beyond segment CS64.

The cam CC-1 on shaft 95 for rotation with it is constructed so that it opens a normally closed limit switch 90LS when brush BR1 in series with coil 90CR engages. The cam has a contour so that it keeps switch 90LS open until brush BR1 passes segment CS66 for the next revolution of shaft 302. The commutator switch is driven so that there are two revolutions of shaft of commutator switch for one revolution of cam CC-1 and of shaft 95. During the second revolution of shaft 302, any of the contacts 1CR-3 through 64CR-3, even though closed, does not electrically connect for energization segments CBC1 through CBC64.

During the last part of the first revolution and during the second revolution of shaft 302 commutator switch, carriage 36 is driven to its home position. A normally closed contact 95CR-4 is open because of the energization of coil 95CR for the restoring operation as described later. The contact 95CR-4 is in series with contact 91CR-2 of the holding circuit for coil 91CR. Another normally closed contact 95CR-3 is in series with contacts 2CR-3 through 64CR-3 connected to the segments CS2 through CS64. These contacts 95CR-3 and 95CR-4 prevent energization of coil 91CR. This provides fast speed drive of chains 97 during the last part of the first revolution and of the second revolution of the shaft of the commutator switch. The contact 88CR–9 in series with the first segment CS1 of the bar of the commutator switch is now closed. The cam CC–1 allows limit switch 90LS to close just as BR6 in series with coil 91 is moved to engagement with segment CS1. Because this segment CS1 is now connected for energization coil 91CR is energized to convert the chain drive from the fast speed to the slow speed as described above. The chain drive continues at the slow speed until the first brush BR1, that is, the brush in series with coil 91CR engages the first segment CS1 of the bar. At this point, coil 99CR is energized through now-closed switch 90LS and contact 88CR–9, thereby stopping the chain drive as described above. The chain cannot be driven until carriage 36 reaches the snapping position during the cutting operation for the next glass sheet G.

If the apparatus is to be used for scoring and snapping of the glass sheet but without spacing of the newly formed glass sheets, an operator moves manual switch 94SW in series with a coil 94CR of a relay. This energizes coil 94CR–1 to open normally closed contact 94CR that is in series with all of the normally open contacts 2CR–3 through 64CR–3 that are connected to segments CS2 through CS64 of the commutator switch. As a result, none of these segments of the bar can be energized. At the same time coil 94CR closes a normally open contact 94CR–2 in parallel with normally open contact 1CR–3 which is connected to segment CS1 of the commutator bar. This energizes CS1 to prevent the operation of the chain drive and thus prevents the spacing operation.

The coil 98CR–1, which closes contacts 98CR in series with coil 98SV and 98CR–2 in series with relay 7TR, is in series with contact 6TR–2 as mentioned above. The coil 98CR is also in series with a normally open contact 90CR–4. Contact 6TR–2 is between contact 90CR–4 and coil 98CR. When chains 97 are being driven, coil 90CR is not energized and under this condition, coil 98CR cannot be energized. When chains 97 stop, it is because coil 90CR is energized. This closes contact 90CR–4 to energize coil 98CR when contact 6TR–2 closes. The latter occurs when the contact 6TR–1 in series with wipers of levels L5 and L6 of the stepping switches SS1–L, SS2–L and SS3–L (FIG. 21C) opens to stop the upward movement of one of snapping devices 280 through the deenergization of the appropriate one of coils 1SV through 64SV.

The energization of coil 98CR closes contacts 98CR–1 in series with coil 98SV, for the fast retraction of the operating snapping device 280, and relay 7TR, as described above. The relay 7TR, after its period of delay, closes a normally open contact 7TR–1 of the on delay type to energize coil 89CR in series with it. Thus after the delay of relay 7TR–1 and that of contact 7TR, the energization of coil 89CR–1 closes a contact 89CR in series with coil 92CR to close contact 92CR–1 (FIG. 22). When contact 92CR–1 closes, coil 92MC is energized. Then the electric clutch of coupling 129 engages to start rotation of shafts 108.

One of shafts 108 has another cam EC–2 mounted on it. A coil 93CR of a relay is in series with a normally closed limit switch 93LS (FIG. 21C). The cam EC–2 is a 60 degree cam, i.e., has a contour and is positioned so that after 54 degrees of rotation until 354 degrees of rotation, it allows switch 93LS to be closed but from 354 degrees of rotation to initial position and for the next 54 degrees of rotation it keeps switch 93LS open. Thus during part of one revolution of cam EC–2, it closes switch 93LS to energize 93CR. This closes a normally open contact 93CR–1 in series with coils SS1, SS2 and SS3 (FIG. 23). The contact 93CR–1 is in parallel with contacts SS1–Int, SS2–Int and SS3–Int. Between contact 93CR–1 and coil SS1 is a contact SS2–1 of the type described below. Between contact 93CR–1 and coil SS2 are a contact SS3–1 and a contact SS2–2 of the type described below. Between contact 93CR–1 and coil SS3 is a contact SS3–2 of the type also described below. By means of these contacts that are between contact 93CR–1 and coils SS1, SS2 and SS3, only the appropriate coil of one of the three stepping switches will be energized and then only for one step when contact 93CR is closed by EC–2 closing switch 93LS.

The contact SS2–1 between contact 93CR–1 and coil SS1 is closed when switch SS2–L is at its home position. At all other positions of switch SS2–L, contact SS2–1 is open. Thus during the stepping of switch SS1–L, except for its initiation and for its restoring to home position, current flows through contact SS2. When switch SS1–L steps to the point where the wiper of level L7 engages the first contact of the bank of contacts of that level switch SS2–L is stepped away from its home position as described earlier. From that moment until switch SS2–L is returned to its home position during the end of the restoring operation, contact SS2–1 is open.

The contact SS2–2 between contact 93CR–1 and coil SS2 is closed for all positions of switch SS2–L, except the home position when it is open. Thus so long as switch SS2–L is in its home position, as is the case during the stepping of switch SS1–L, the closing of contact 93CR–1 will not energize coil SS2. This contact SS2–2 closes as soon as coil SS2 is energized for one step by current flowing to it through the wiper of level L7 of switch SS1–L, as described earlier. Then each time contact 93CR–1 closes it energizes coil SS2 to produce one step of switch SS1–L. When switch SS2–L steps its wiper of level L7 into engagement with the first contact of the bank of contacts of that level, coil SS3–L is energized to step switch SS3 away from its home position. This opens switch SS3–1 in series with coil SS2 and contact 93CR–1 because that contact SS3–1 is only closed so long as switch SS3–L is in its home position. Thus contact SS3–1 prevents energization of coil SS2 during the stepping of switch SS3–L by each closing of contact 93CR–1.

The contact SS3–2 between contact 93CR–1 and coil SS3 is of the type that is open when switch SS3–L is at its home position but is closed for all other positions for switch SS3–L. Thus when switch SS3–L is stepped from its home position by current passing through the wiper of level L7 of switch SS2–L to coil SS3, contact SS3–2 closes. Then each time contact 93CR–1 closes during the eccentric drive of spacing device 90 switch SS3–L steps to move the wiper of level L1 or L3 to the next position.

In view of the foregoing description of the circuits containing contact 93CR–1 in series with coils SS1, SS2 and SS3, it is apparent that each time contact 93CR–1 closes one of switches SS1–L, SS2–L and SS3–L steps to the next position. If the wiper of either level L1 or L3 of that stepping switch then engages an energized contact, current will flow through that wiper to energize the associated coil with the result that the switch steps again. The stepping continues until the wiper of either level in sequence engages a nonenergized contact. The stepping moves the wiper of either level L5 or L6 of the same stepping switch into engagement with the appropriate contact of its associated bank of contacts.

During this operation of one or more of the stepping switches, chains 97 are moved, as described above, until the brush BR1 connected to coil 90CR engages an energized segment CS1 of the commutator bar that is connected to a now-closed contact of contacts 1CR–3 through 64CR–3 that is associated with the relay that has the now-open contact engaged by wiper of level L1 or level L3 of the one of the stepping switches. At this point coil 1TR is deenergized as described above, thereby ultimately resulting through another contact of the same relay and the wiper of level L5 or L6 of one of the stepping switches in the energization of the appropriate one of coils 1SV through 64SV for the snapping operation. This is followed by the spacing operation and then the initiation again of the stepping operation, as described above.

For the last part of the snapping operation, i.e., the part in which snapping device 280 is retracted, simultaneously with the opening of contact 6TR–1 in series with levels L5 and L6 of the stepping switches, coil 98CR (FIG. 21B) is energized by the closing of contact 6TR–2 in series wtih it. This energizes 89CR after a delay as described above. This closes contact 89CR–1 in series with coil 92CR–1 (FIG. 21C). The contact 92CR in series with coil 92MC closes to energize the latter. The clutch of coupling 129 engages, thereby initiating the eccentric drive for the rotation of shafts 108 of spacing device 90. At the same time the energization of coil 92CR opens a normally closed contact 92CR–3 in series with a coil 92MB of the brake of coupling 129 to disengage the brake. The eccentric drive continues until cam EC–1 momentarily opens switch 97LS to energize coil 97CR (FIG. 21C), which is maintained energized by the closing of contact 97CR–2 of its holding circuit. The energization of coil 97CR opens contact 97CR–1 in series with coil 90CR. This deenergizes coil 90CR thereby starting the drive for chains 97, as described earlier. In addition, the energization of coil 90CR–4 opens contact 90CR in series with coil 98CR (FIG. 21B), thereby dropping out coil 98CR and relay 7TR–1. This opens contact 7TR in series with coil 89CR. The deenergization of coil 89CR–1 opens contact 89CR in series with coil 92CR (FIG. 21C). However, before coil 89CR is deenergized, cam EC–2 has rotated to the point where it no longer keeps switch 93LS open. Thus coil 93CR (FIG. 21C) is energized before coil 89CR (FIG. 21B) is deenergized. A normally open contact 93CR–2 is in series with coil 92CR (FIG. 21C) and in parallel with contact 89CR–1 that initiated the energization of coil 92CR. This contact 93CR–2 closes before contact 89CR–1 opens and maintains coil 92CR energized until cam EC–2 has almost returned to its home position, at which point cam EC–2 reopens switch 93LS. This deenergizes coil 93CR–2, thereby opening contact 93CR to deenergize coil 92CR–1. This opens contact 92CR in series with coil 92MC and closes contact 92CR–3 in series with coil 92MB (FIG. 22). Thus the clutch of coupling 129 disengages and the brake operates to stop the eccentric drive.

For the operation of the apparatus without the spacing of glass sheets, manual switch 94SW is closed to energize coil 94CR. This opens normally closed contacts 94CR–3 and 94CR–4 in series with coil 92CR (FIG. 21C) and with coil 3M (FIG. 21A) thereby preventing the operation of the eccentric drive when coil 89CR is energized to close contact 89CR–1 also in series with coil 92CR (FIG. 21C). The energization of coil 94CR–5 closes a normally open contact 94CR (FIG. 21B) in series with coil 98CR and in parallel with contact 90CR–4 so that contact 6TR–2, when closed, energizes coil 98CR whether or not coil 90CR is energized. This contact 94CR–5 is a safety contact, because in the "no spacing" operation chains 97 remain in their home position. This is true because coil 90CR remains energized through a now-closed, normally open contact 94CR–2 in parallel with contact 1CR–3 connected to the first segment CS1 of the commutator bar (FIG. 21C). Because neither the chains 97 are driven nor the eccentric drive is operated, limit switches 90LS and 97LS (FIG. 21C) remain closed and open, respectively. Cams CC–1 and EC–1 do not operate. The coil 97CR is not energized so that contact 97CR–1 in series with coil 90CR remains closed. With coil 97CR energized, this opens a normally closed contact 94CR–1 in series with contacts 2CR–3 through 64CR–3 connected to segments of the commutator bar. This also is a safety contact as it prevents energization of these segments of the commutator bar.

When the spacing device 90 is not driven, cam EC–2 also remains stationary. Thus switch 93LS remains open and coil 93CR remains deenergized. A normally closed contact 93CR–3, in series with a normally closed contact 94CR–6 and relay 5TR, remains closed, but contact 94CR–6 opens because coil 94CR is energized. This prevents energization of relay 5TR through this circuit. However, in parallel with these contacts 94CR–6 and 93CR–3 is a circuit containing a normally open contact 94CR–7, which is now closed, and a normally closed contact 89CR–2, which opens after the delay period following the energization of coil 98CR for the fast retract of snapping device 280. By this parallel circuit relay 5TR is deenergized to open contacts 5TR–1 in series with relay 6TR and 5TR–2 in series with the levels L5 and L6 of the stepping switches. This places the latter circuits in the condition shown in FIG. 21B so that none of coils 1SV through 64SV can be energized until relay 1TR is deenergized, as described earlier.

For the "no spacing" operation, contact 93CR–1 in series with coils SS1, SS2 and SS3 cannot be utilized to step these switches in sequence after each has been stepped from its home position. To accomplish this type of stepping, a circuit having a normally open contact 94CR–8, a normally open contact 98CR–3 and normally closed contact 7TR–2 of the on delay type is utilized. This circuit is in parallel with contact 93CR–1. With coil 94CR energized, contact 94CR–8 is closed. At the retracting portion of each snapping operation, coil 98CR is energized to close contact 98CR–3 and after a delay to open contact 7TR–2. Until contact 7TR–2 opens there is a brief period after the closing of contact 98CR–3 for the energization of the appropriate coil of one of the three stepping switches.

Also rotated with shaft 95 for the movement of chains 97 is a cam CC–2 which momentarily closes a normally open limit switch 95–1LS in series with coil 95CR of a relay (FIG. 21C) when the brush in series with coil 90CR is in engagement with the segment CS65 of the commutator bar during the first of two revolutions of the rotatable shaft of the commutator switch. When limit switch 95–1LS closes, coil 95CR is energized to begin the restoring operation. In series with switch 95–1LS and coil 95CR is a normally open contact 88CR–10 to prevent the energization of coil 95CR whenever carriage 36 is not in the position for the snapping operation. The energization of coil 95CR by the momentary closing of switch 95–1LS is maintained by a holding circuit in parallel with switch 95–1LS and contact 88CR–10 and including a normally open contact 95CR–5. A normally open, maintained closed, limit switch 95–2LS is open only when carriage 36 is in the home position. Thus coil 95CR remains energized until carriage 36 returns to its home position.

A normally open contact 8TR–1 of the off delay type (FIG. 21C) is in series with coil 95CR and in parallel with its holding circuit. The contact 8TR–1 energizes coil 95CR after all snapping operations when there is the "no spacing" operation of the apparatus. The cam CC–2 cannot close switch 95–1LS because there is no chain drive. The contact 8TR–1 closes when the stepping switches have gone through their sequence of operation to the point that the stepping switch SS3–L moves the wiper of its level L6 to engage the next contact after that in series with coil 64SV. The former contact and the next one of that level L6 are joined to each other and are in series with a normally open contact 94CR–9, a normally closed contact 95CR–6 and a coil 8TR of a relay of the off delay type. The contact 94CR–9 in this circuit is closed because coil 94CR is energized for the "no spacing" operation. The coil 8TR drops out, after a delay, because contact 95CR–6 in its circuit opens when coil 95 is energized through contact 8TR–1. The energization of coil 95CR is then maintained by the holding circuit until carriage 36 returns to its home position to open limit switch 95–2LS as explained above.

Also in series with coil 95CR is a normally open pushbutton switch 95PB which can be momentarily closed by an operator to start the restoring operation. The coil 95CR is maintained by its holding circuit and drops out as described above.

Various circuits are provided with normally closed contacts 95CR-7 through 95CR-12, which are opened during the restoring operation by the energization of coil 95CR. For example, contact 95CR-7 in series with coils 75CR, 76CR and 77CR (FIG. 21A) during the restoring operation prevents the energization of coils 75SV, 76SV and 77SV so that three of the rows of casters 69 will not be raised. The contacts 95CR-8 in series with coils 81CR and 96CR prevent their energization during the restoring operation. The latter prevents the energization of coil 65SV and thus prevents the raising of the other rows of casters 69. In the circluit, described above, that contains the normally closed contacts 95CR-7 and 95CR-8, there are also normally closed contacts 88CR-11 and 88CR-5 which also prevents the raising of any of the casters by the energization of any coils when carriage 36 is also in the snapping position. Of course, these contacts 88CR-11 and 88CR-5 return to their normally closed position when carriage 36 starts toward its home position, then contacts 95CR-7 and 95CR-8 open and remain open until the end of the restoring operation.

The circuit that contains a normally closed contact 88CR-5 and a normally closed contact 95CR-8 has coils 81CR (FIG. 21D). These contacts prevent the energization of coils 81CR when carriage 36 is in the snapping position and is returning to its home position.

As described earlier, the energization of coil 83SV (FIG. 21D) for the clamping of sheet G during the cutting operation is dependent upon the closing of contact 83CR-4 through energization of coil 83CR at the time the squaring of the glass sheet G is completed. The deenergization of coil 83CR in its holding circuit occurs with the opening of a normally closed contact 88CR-7 in series with coil 83CR when carriage 36 reaches the snapping position. This circuit is further provided with a normally closed contact 95CR-9 which opens when carriage 39 moves toward the home position. These prevent the lowering of arms 170 during the snapping, spacing and restoring operations.

The circuit providing current through limit switch 90LS and either one of contacts 2CR-3 through 64CR-3 to the segments of the bar of the commutator switch (FIG. 21C) includes a normally closed contact 95CR-3 which is open during the restoring operation to prevent the energization of any but segment CS1 of the commutator bar switch to one of the main lines of the 110-volt D.C. current. Likewise, the holding circuit for coil 91CR includes a normally closed contact 95CR-4 which is opened during the restoring operation to prevent energization of coil 91CR.

As seen in FIG. 23, a coil 95CRX of a relay is in series with a normally open contact 95CR-10. During the restoring operation, contact 95CR-10 closes to energize coil 95CRX. This opens three normally closed contacts 95CRX-1, 95CRX-2, and 95CRX-3, each being in series with one of the coils SS1, SS2 and SS3 and between them and contact 7TR-2 and contact 93CR-1. This prevents the energization of any of these three coils during a possibility of the closing of contact 93CR-1 or contact 98CR-3 in parallel circuits either of which is used to step switches SS1-L, SS2-L and SS3-L in sequence, as described above.

Three other normally closed contacts 95CRX-4, 95CRX-5, and 95CRX-6 are used. One is between levels L1 and L3 of switch SS1-L and contact SS1-Int. Another is between levels L1 and L3 of switch SS2-L and contact SS2-Int. The third is between levels L1 and L3 of switch SS3-L and contact SS3-Int. These contacts open and prevent any possibility of energizing coils SS1, SS2 and SS3 during the restoring operation.

Between each contact SS1-Int and its associated coil, either SS1, SS2 or SS3, are resistors R1, R2, and R3 respectively, and in parallel with resistors R1, R2 and R3 is a normally closed contact, either contact SS1-2, SS2-3 or SS3-4 respectively. This arrangement permits the use of maximum voltage to energize coils SS1, SS2 and SS3, but continued energization at a lower voltage for an extended period occurs because the contact SS1-2, SS2-3 or SS3-4 opens when coil SS1, SS2 or SS3, respectively, is energized and then current flows only through resistors R1, R2, and R3 respectively. This is a well-known safety feature to protect the coils of the stepping switches, if for some reason they are energized for a considerable period of time.

The circuitry is provided with other well-known protective devices. Some of these are illustrated in the drawings. For example, resistors R4, R5 and R6 and condensers C1, C2 and C3 are in series with each other and parallel with contact SS1-Int (FIG. 23). This prevents damage to normally closed contact 95CRX-4 and the bank of contacts of levels L1 and L3 of switch SS1-L when contact SS1-Int opens. It also prevents arcing damage to other contacts in other circuits that are in series with contact SS1-Int. A resistor R5 and a condenser C2 are in parallel with contact SS2-Int and a similar combination R6 and C3 is in parallel with contact SS3-Int for the same reason. A condenser 92BC is in parallel with coil 92MB of the electric brake of coupling 129 to prevent damage of normally closed contact 92CR-3 (FIG. 22) when the latter is deenergized. A condenser 92CC is in parallel with coil 92MC of the electric clutch of coupling 129 to prevent damage to normally open contact 92CR-1 when coil 92MC is deenergized.

A contact SS1-1 and a normally open contact 95CRX-7 are in another circuit connecting contact SS1-2 and coil SS1 to one of the main lines of 115-volt D.C. source. Similarly contact SS2-Int and coil SS2 are connected by a contact SS2-4 and a normally open contact 95CRX-8, and contact SS3-Int and coil SS3 are connected by a contact SS3-5 and a normally open contact 95CRX-9 to this main line of the power source. These contacts SS1-1, SS2-4 and SS3-5 are of the type that are open only when each stepping switch is in its home position. It is recalled that before the restoring operation each stepping switch has been operated to step the wipers of the various levels away in the direction indicated by the arrows from the positions shown in FIGS. 21E and 23. The stepping switches are now in positions in which the wiper of each level L7 of the stepping switches engage the first contact of its associated banks of contacts. At the time of the initiation of and during the restoring operation, these contacts SS1-1, SS2-4 and SS3-5 in series with normally open contacts 95CRX-7, 95CRX-8, and 95CRX-9 are closed. During the restoring operation, these contacts 95CRX-7, 95CRX-8, and 95CRX-9 close with the energization of coil 95CRX. The current then flows through each contact SS1-Int, SS2-Int and SS3-Int to energize coils SS1, SS2 and SS3. As explained above contacts SS1-Int, SS2-Int and SS3-Int, after a brief interval, open to deenergize coils SS1, SS2 and SS3 causing the stepping switches to move one step. The contacts SS1-Int, SS2-Int and SS3-Int then close so that current again flows into coils SS1, SS2 and SS3 followed by the opening of these interrupter contacts to again deenergize coils SS1, SS2, and SS3 for the next step of the switches. The switches continue to step until the wipers reach the positions shown in FIGS. 21C and 23. This is the home position. No further stepping occurs because the contacts SS1-1, SS2-4 and SS3-5 that are in series with normally open contacts 95CRX-7, 95CRX-8, and 95CRX-9 are now open and when contacts SS1-Int, SS2-Int and SS3-Int close, current can no longer flow again to coil SS1, SS2 and SS3.

In FIG. 23, the contact 88CR-8 in series with contact SS1-Int and coil SS1 is now open because carriage 36 moves away from the snapping position during the restoring operation. The carriage 36 moves to its home position. The stepping switches are now in the home position and ready to be initiated by the closing of this contact 88CR–8 when carriage 36 reaches the snapping position in the sequence of operations for cutting the next glass sheet G.

In series with coil 1TR and in parallel with the wipers of levels L2 and L4 of the stepping switches (FIG. 23) is a contact SS1–3, which is closed only when switch SS1–L is in its home position. When the latter occurs, as described above, coil 1TR is energized to open contact 1TR–1 (FIG. 21B). This prevents initiation of relays 5TR and 6TR until switch SS1–L steps from its home position and it or one of the other stepping switches has one of their wipers L2 and L4 engage a nonenergized contact in the sequence of operation for cutting the next glass sheet G.

When it is desired to provide for a manual operation of snapping rather than automatic sequential snapping of the various cuts, the switch 99SW is opened thereby deenergizing coil 99CR of a relay (FIG. 21B), thereby opening a normally open contact 99CR–1 in series with normally closed contact 1TR–1 so that relay 5TR is deenergized. Thus normally open contact 5TR–2 in series with normally closed contact 6TR–1 and levels L5 and L6 of stepping switches SS1–L, SS2–L and SS3–L remains open and cannot be used to energize solenoids 1SV through 64SV or to energize relay 8TR. To actuate the appropriate snapping devices manually rather than automatically, the circuitry is provided with circuits not shown having push-button switches, each of which is in series with one of coils 1SV through 64SV. An operator, by closing one or more of these push button switches, as desired, in sequences carries out the appropriate running of the cuts. With this arrangement coil 8TR (FIG. 21E) cannot be energized. To start the restoring operation it is necessary for an operator at the appropriate time to momentarily close push-button switch 95PB. When coil 99CR (FIG. 21B) is deenergized by the opening of switch 94SW, this opens the normally open contacts 99CR–2 and 99CR–3 between normally closed contact 6TR–1 and the wipers of levels L5 and L6 of switches SS2–L and SS3–L, and between the main line of power source and all other banks of contacts of the stepping switches and their coils as seen in FIG. 23. These are merely safety contacts.

As mentioned earlier, the energization of coil 96CR energizes coils 65SV and 75SV through 77SV through closing of contact 96CR–1. This raises casters 69 a short period of time after the drive for belts 58 ceases. The coil 96CR was energized when contact 3TR–1 closed. The contact 3TR–1 remains closed until coil 3TR is energized by the closing of contact 1M–5, which occurs when motor M1 restarts. However, coil 96CR is deenergized when a normally closed contact 83CR–6 in series with it opens. This happens when the squaring operation is complete, because coil 83CR is energized as explained earlier. This opens a normally closed contact 83CR–7 in series with coils 75CR through 77CR, thereby preventing the raising of casters 69. In addition, the energization of coil 83CR closes a normally open contact 83CR–8 in series with contact 67CR–1 and coils 1CR through 64CR, the latter being connected through push-button switches 1PB through 64PB. Because of this normally open contact 83CR–8, the coils cannot be energized through the push-button switches during the selective cutting operation with the carriage 36 in the stop position, after pushing the glass sheet G until the squaring operation is complete.

Because coil 83CR drops out by the opening of normally closed contact 88CR–7 in series with it when carriage 36 arrives at the snapping position, contact 88CR–5 in series with coil 96CR closes but energization of the latter is prevented by the simultaneous opening of a normally closed contact 88CR–5 also in series with coil 96CR. The energization of coils 83CR and 96CR, when carriage 36 leaves the snapping position during the restoring operation, is prevented by normally closed contacts 95CR–8 and 95CR–9 in series with these coils. These contacts 95CR–8 and 95CR–9 are open during the restoring operation.

A normally open contact 71CR–3 is also in series with coil 96CR. This contact is closed when belts 68 are supporting glass sheet or sheets, because of the energization of coil 71CR, as explained below. During the restoring operation the smaller glass sheets are moved from belts 58 and during this operation coil 71CR is deenergized and remains deenergized until the next glass sheet G is moved by conveyor 31 toward belts 58. This arrangement prevents the raising of casters 69 after a squaring operation until a new glass sheet G is on belts 58.

When coil 95CR is energized for the restoring operation, this closes a normally open contact 95CR–11 in series with coil 72CR (FIG. 21A). The coil 72CR is energized and remains energized by means of a holding circuit containing a normally open contact 72CR–1 that is now closed. The energization of coil 72CR closes a normally open contact 72CR–2 in series with coil 74CR. The resultant energization of coil 74CR opens a normally closed contact 74CR–2 in series with coil 73CR that had been energized by the closing of switch 73–2LS when sheet G was moved toward belts 58 by conveyor 31 and was maintained energized by normally open contact 73CR–1 in its holding circuit. The energization of coil 73CR initiated relay 11TR, as described earlier, by the closing of contact 73CR–2 in series with relay 11TR. Now, however, during the restoring operation, the deenergization of coil 73CR drops out relay 11TR. After a delay this opens contact 11TR–2 in series with coil 1M and closes contact 11TR–1 in series with coil 71CR. The latter, when energized, opens contact 71CR–1 also in series with coil 1M. Previous to this the energization of coil 74CR opened contact 74CR–1 also in series with coil 1M. Thus the closing of contact 11TR–2 cannot energize coil 1M through the circuit containing contacts 71CR–1 and 74CR–1 because contact 74CR remains open even though contact 71CR–1 closes simultaneously with the closing of 11TR–2 because of the opening of contact 11TR–1 in series with coil 71CR. However, in parallel with these contacts 71CR–1 and 74CR–1 is a normally open contact 105CR–1, which is part of a relay of the controller (not shown) for the receiving conveyor 32. In this controller, contact 105CR–1 is closed only when conveyor 32 is in condition to receive the cut glass sheets from belts 58. When this condition is established and when contact 11TR–2 closes, coil 1M is energized to operate motor 1M for the transfer of the cut glass sheets to conveyor 32.

When conveyor 32 receives these glass sheets, the controller opens contact 105CR–1. Before this happens the glass sheets being moved off belts 58 close switch 4LS to energize coil 4TR–1. The contact 4TR opens to deenergize coil 72CR. This closes contact 74CR–1 in series of coil 1M before contact 105CR–1 opens.

If an operator wants to pass a glass sheet through the apparatus without stopping it, the operator closes switch 1SW to energize coil 1M if contact 105CR–1 is closed. The switch 1SW is in parallel with contact 11TR–2 and is in series with contact 71CR–1 and 74CR–1 as well as with contact 105CR–1. As a result, before switch 105CR–1 opens, contact 74CR–1 closes, as described above, to maintain coil 1M energized so long as the operator maintains switch 1SW in the closed position.

As mentioned earlier, an operator has a chance to cancel a program of cutting when the selective cutting operation is utilized. This occurs when carriage 36 stops after the squaring operation. To change the programming of cutting from that previously used, an operator momentarily opens push-button switch 65PB in series with contacts 1CR–1 through 64CR–1 of the holding circuits for coils 1CR through 64CR. Then the operator energizes the appropriate one or more of coils 1CR through 64CR by normally closing the appropriate push-button switches 1PB through 64PB. This energizes the appropriate solenoids 1SOL through 64SOL for unlatching of the appropriate cutter assemblies 180 when contact 87CR-4 in series with the solenoids is closed by the energization of coil 87CR. The latter occurs for selective cutting when an operator momentarily closes switch 87PB. The coil 87CR is maintained energized by contact 87CR-2 in its holding circuit. In the cordwood cutting operation, coil 87CR is energized automatically, as described above, by the use of closed contact 68CR-1.

The energization of coil 87CR closes a normally open contact 87CR-1 in series with coil 120-1SV to operate carriage 36 in its forward direction. When carriage 36 arrives at the snapping position, cam plates 253 are abutted by plates 190 and move the latter about shafts 188 for those cutter assemblies 180 that have been used for scoring. This moves flanges 191 of those cutter assemblies 180 to the position shown in FIG. 19. When the restoring operation is started after the snapping and spacing operation, coil 95CR is energized as explained above. This opens a normally closed contact 95CR-12 in series with coil 87CR. The deenergization of coil 87CR-4 opens contact 87CR in series with solenoids 1SOL through 64SOL. The deenergization of the solenoids lowers any previously raised latches 185 to the position shown in FIG. 19. Now all cutter assemblies are in the condition shown in FIG. 19 so that, during the movement of carriage 36 to the home position, cutter wheels 196 are kept out of contact with the glass sheet.

As seen in FIG. 21B, a normally closed contact 88CR-12 is in series with push-button switches 1PB through 64PB and a normally open contact 88CR-13 is in series with contacts 1CR-1 through 64CR-1 of the holding circuits for coils 1CR through 64CR. With carriage 36 in the snapping position, coil 88 is energized, as explained earlier. Thus, the opening of normally closed contact 88CR-12 prevents an operator from inadvertently energizing one or more of coils 1CR through 64CR that are not to be energized for the cordwood cutting program in effect. The closing of push-button switches 1PB through 64PB cannot energize the coil in series with it because contact 88CR-13 is open. In addition, the closing of normally open contact 88CR-13 when carriage 36 is in the snapping position prevents the inadvertent cancelling of the present cutting program if an operator open switch 65PB. As a result, for selective cutting, the apparatus can be used for the cutting of the next glass sheet G with assurance that the cutting program has not been changed inadvertently when carriage 36 is in the snapping position.

The coil 70CR is energized at the start of the operation and remains energized unless for emergency reasons the belt drive must be stopped. The latter is done by momentarily opening switch 70-1PB. The circuits having coils of relays and coils of solenoid valves for the various driving mechanisms each includes a normally open contact 70CR labeled 70CR-1 through 70CR-8 and, of course, these are closed under normal operating conditions. These contacts are in the circuits containing coils 65SV and 75SV through 77SV for the raising of casters 69, coils 120-1SV and 120-2SV for the drive of carriage 36, coil 92CR for the eccentric drive, and coils 90SV and 91SV for the chain drive. In addition, there is a normally open contact 70CR-5 in series with coil 99CR to prevent the utilization of the stepping switches. This is true because the deenergization of coil 70CR deenergizes coil 99CR to open contacts 99CR-4 through 99CR-4 in series with the banks of contacts of all level of the stepping switches.

The manual switch 67SW merely provides a choice between cordwood cutting or selective cutting as described above. The switch 67SW can be provided with another position and contact for energizing a coil (not shown) of a relay which will close a normally open contact (not shown), and this will electrically connect coils 1CR through 64CR to circuits of an automatic programming device (not shown) that will energize one or more of coils 1CR through 64CR. These circuits by-pass push-button switches 1PB through 64PB, and thus, of course, by-pass contacts 67CR-1, 83CR-8 and 88CR-12 in series with push-button switches 1PB through 64PB and by-pass contact 68CR-1 in series with push-button switches 1PB through 64PB and with normally closed contact 88CR-12. The holding circuits containing contacts 1CR-1 may be retained, but switch 65PB and contact 88CR-13 in parallel with it are replaced through 64CR by a normally closed contact that is opened by the programming device.

As mentioned earlier, table 38 has a top surface that is convexly curved in the longitudinal direction. This crown in the top surface of table 38 provides a bowing of the glass sheet G on table 38 because of the sheet's own weight. As a result, the operation of the snapping devices 280 in cooperation with the associated moment devices 162 provides a satisfactory running of the cuts, even though the snapping devices operate the margin of the glass sheet. This combination of the crown in the table and the snapping device at the margin of the glass sheet is necessary to run the cut from edge to edge in the case of the thicker glass sheets to be cut.

In the foregoing description of the preferred embodiment, which is presented merely for purpose of illustration, there are many components present that can be eliminated from the apparatus if it is not desired to provide certain features of the operation. For example, it is not completely necessary to provide a structure and devices by which a spacing operation can be accomplished, although the presence of this structure and components is necessary to give full assurance of protection against damage of the glass edges of the smaller glass sheets as they are moved from the cutting apparatus.

When the feature of the spacing operation is not utilized, table 38 does not require the sectionalization that is necessary when using spacing chains. Of course then the rest of the spacing device 90 and associated components is not required.

The pusher assemblies 218 and stop assemblies 245 along with casters 69 for the alignment or squaring of glass sheet G may be eliminated from the apparatus. However, their presence is preferred because it is desirable for maximum utilization of the glass sheet to move th cutter in a direction perpendicular to the direction of an edge of the glass sheet. The general advantage of this alignment is well known in the art.

Various modifications of the apparatus will be apparent to one skilled in the art from the description of the preferred embodiment presented above and in the drawings. Thus the invention is not to be limited by this description but only by the claims that follow.

We claim:

1. An apparatus for cutting a glass sheet which comprises a table to support the sheet, means to cut the sheet on the table along a continuous line extending transversely of the elongitudinal axis of the table from an edge of the sheet to an opposite edge to provide smaller glass sheets, spacing means to lift and to move laterally one of the smaller glass sheets away from the other smaller glass sheet to provide the smaller glass sheets in spaced relationship on the table, and conveyor means to move the glass sheet onto the table and to move the smaller glass sheets off the table in the spaced relationship, said table having a top surface with longitudinal sections spaced transversely from adjacent longitudinal sections and said spacing means including glass-sheet supporting means mounted between the transversely spaced longitudinal sections of said table for movement between positions above and below the top surface of said table and means to move said glass-sheet supporting means between said positions and in a longitudinal direction when the glass-sheet supporting means are above the top surface of the table.

2. An apparatus for cutting a glass sheet which comprises a table to support the sheet, means having belts to move the sheet onto and off the table in a horizontal direction and in parallel with longitudinal axis of the table, means to cut the sheet along a rectilinear line transversely of the longitudinal axis of the table to provide closely adjacent smaller glass sheets, said table having longitudinal sections with top surfaces of adjacent sections transversely spaced from each other and said belts being moved across said table sections, spacing means between the table sections, and means to move the spacing means in a cyclic path in a vertical plane parallel to the longitudinal axis of said table including a portion of the path in which the spacing means is above the top surface of the table and is moved longitudinally when above the top surface of the table, said spacing means being moved to engage only one of the closely adjacent smaller glass sheets during the movement of the spacing means of the cyclic path.

3. An apparatus for cutting a glass sheet which comprises a supporting structure, a table to support the sheet, said table having a top surface with longitudinal sections spaced transversely from adjacent longitudinal sections, a carriage mounted on the supporting structure, means to move the carriage across the table and between first and second positions, a glass cutter wheel mounted on the carriage to provide a score line on the sheet in the direction of travel of said carriage, means mounted on the supporting structure between the table sections to lift the glass sheet from the table sections to a raised position, a pair of means mounted on the carriage to push transversely the sheet in the raised position, said pair of pusher means being mounted for pivotal movement about a horizontal axis and for horizontal movement relative to said carriage, a pair of means mounted on the supporting structure to stop movement of the raised glass sheet by said pusher means, said pair of stop means being mounted for movement between raised and lowered positions and in the raised position aligning the abutting edge of glass sheet in a vertical plane normal to the direction of movement of the carriage, and means actuated by the relative horizontal movement of the pusher means in a direction opposite to the movement of the carriage from the first position to the second position to rotate the pusher about its axis for movement above the sheet, to lower the sheet-lifting means between the table sections and to lower the pair of stop means.

4. An apparatus for cutting a glass sheet which comprises a supporting structure, a table to support the sheet, a carriage mounted on the supporting structure, means to move the carriage across the table and between first and second positions, glass cutter wheels mounted on the carriage for movement between a raised position and a lowered position to provide a score line on the sheet in the direction of travel of said carriage, first relay-actuated means separately and operatively associated with each cutter wheel to retain said wheel in the raised position, snapping means including snapping heads mounted on the supporting structure, second relay-actuated means separately associated with each snapping head to lift upwardly the snapping head against the glass sheet at a margin to raise the glass sheet, moment heads mounted on the carriage, said snapping heads and moment heads having surfaces opposing the sheet that are curved convexly about axes in parallel with the score lines provided by said wheels, each of said snapping heads having the highest portion of said convex surface directly below the score line provided by one of the cutter wheels and said moment heads being positioned so that two are in vertical planes flanking the cutter wheel for each score line and said two moment heads flanking one cutter wheel being between said one cutter wheel and adjacent cutter wheels, and said snapping heads and moment heads being in the same vertical plane normal to the direction of travel of said carriage only when said carriage is at the second position, a relay means to actuate at least some of said first relay-actuated means before completion of the movement of said carriage to the second position whereby cutter wheels associated with said relay-actuated means move to the lowered position to provide a scoring stroke on the glass sheet by each lowered cutter wheel and to actuate in sequence with the carriage at the second position only second relay-actuated means associated with those snapping heads below the score lines made by cutter wheels lowered by the actuation of first relay-actuated means, and means to raise each lowered cutter wheel after its scoring stroke.

5. An apparatus for cutting a glass sheet which comprises a table to support the sheet, said table having a top surface with longitudinal sections spaced transversely from adjacent longitudinal sections, a carriage, means to move the carriage across the table and between first and second positions, glass cutter wheels mounted on the carriage, solenoid-operated means for each cutter wheel to provide downward movement of the wheel to a position for providing by said wheels score lines across the sheet with movement of the carriage toward the second position, solenoids, each solenoid operatively connected to one of said solenoid-operated means, means to raise each cutter wheel after providing said score line, means to snap the sheet along the score lines with the sheet on the table, sheet spacing means including sets of sheet supports, each set being between table sections, a drive means in sequential steps an increasing number of said sheet supports in each set upwardly above the top surface of the table and longitudinally to lift and to move laterally any glass sheet above said sheet supports being moved, each step of the sequence including a group of sheet supports raised in a previous step and sheet supports on one side only of the group, settable control means to energize some of said solenoids in a pattern and to operate said drive means in a pattern related to the pattern of energization of said solenoids.

6. An apparatus for cutting a glass sheet which comprises a table to support the sheet, said table having a top surface with longitudinal sections spaced transversely from adjacent sections, a carriage, means to move the carriage across the table and between first and second positions, cutter wheels mounted on the carriage and spaced from one another in a pattern, solenoid-operated means for each cutter wheel to provide downward movement of the wheel to a position for providing by said wheels score lines across the sheet with movement of the carriage toward the second position, solenoids, each solenoid operatively connected to one of said solenoid-operated means, means to raise each cutter wheel after providing said score line, means to snap the sheet along the score lines with the sheet on the table, chains, a frame having longitudinal plates between the table sections, sprockets rotatably mounted on the plates to drive the chains with their top run supported by the plates, means to drive the sprockets, pad supports mounted on a portion only of each chain, means to move the frame in a cyclic path whereby pad supports in the top run of the chains are moved above the top surface of the table and longitudinally to lift and to move laterally any glass sheet above said pad supports, said chains in their home position each having the leading pad support in the top run below the sheet and between a transverse edge of the sheet and the first possible score line commutator switch having a brush and a commutator bar with a first segment and additional segments spaced one from another in a pattern, means to move said brush around said commutator bar for engagement in sequence with said first segment and then said additional segments, said commutator switch having its home position with the brush in engagement with the first segment, means to energize a number of said solenoids and to connect for energization a number of the segments of the commutator bar in the same pattern, means energized and deenergized through said commutator switch to stop and start respectively said sprocket drive means when said brush is away from its home position, means to move the brush from its home position, means to operate the frame-moving means in a cyclic path each time the brush engages a segment connected for energization after arrival of the carriage at the second position, and means to momentarily deenergize the means to start the sprocket drive means during part of the operation of the frame-moving means whereby the brush is moved out of engagement with said segment which is connected for energization.

7. An apparatus for cutting a glass sheet which comprises a table to support the sheet, said table having a top surface with longitudinal sections spaceed transversely from adjacent sections, a carriage, means to move the carriage across the table and between first and second positions, cutter wheels mounted on the carriage and spaced equally from one another, solenoid-operated means for each cutter wheel to provide downward movement of the wheel to a position for providing by said wheels score lines across the sheet with movement of the carriage toward the second position, solenoids, each solenoid operatively connected to one of said solenoid-operated means, means to raise each cutter wheel after providing said score line, means to snap the sheet along the score lines with the sheet on the table, chains, a frame having longitudinal plates between the table sections, sprockets rotatably mounted on the plates to drive the chains with their top run supported by the plates, means to drive the sprockets, pad supports mounted on a portion only of each chain, means to move the frame in a cyclic path whereby pad supports in the top run of the chains are moved above the top surface of the table and longitudinally to lift and to move laterally any glass sheet above said pad supports, said chains in their home position each having the leading pad support in the top run below the sheet and between a transverse edge of the sheet and the first possible score line, a stepping switch means including first and second levels of wipers and banks of contacts, said wipers being co-rotatable and in their home positions each being one step from the bank of contacts, a commutator switch having a brush and a commutator bar with a first segment and additional segments equally spaced from one another, means to energize separately each of said solenoids and to energize separately each contact of said banks of contacts and separately each segment of the commutator bar with the energizing means being connected to each bank of contacts, the solenoids and the commutator bar segments in the same order, a first relay having a coil electrically connected to the wiper of the first level, an interrupter contact between the first relay and the wiper of the first level, and a second relay having a coil electrically connected to the wiper of the second level, means operated by said sprocket drive means to move said brush around said commutator bar for engagement in sequence of the brush with said bar segments, said brush having its home position in engagement with the first segment, means operated by the carriage at the second position to step the wipers of the switch means from the home position to the first contact of the banks of contacts whereby the first wiper of the first level continues to step along the first bank of contacts to engage a nonenergized contact and the wiper of the second level moves to a nonenergized contact for deenergization of the second relay, relay means to operate said sprocket drive means, means operated by said second relay when deenergized to operate said relay means, means energized and deenergized by said commutator switch to stop and start, respectively, operation of said sprocket drive means, means to move the commutator bar from its home position, means operated by the deenergization of the second relay to operate the frame-moving means in the cyclic path, means to momentarily deenergize the commutator bar during part of the operation of the frame-moving means whereby the commutator bar rotates to restart the sprocket drive means, and means to energize the first relay to move the wipers of the levels one step from a deenergized contact of the banks of contacts.

8. The apparatus of claim 7 and further including a supporting structure, snapping assemblies to snap the sheet along the score lines, each of said snapping assemblies including a snapping head mounted on the supporting structure and spaced from one another the same distance as the spacing between the cutter wheels with the snapping heads being in alignment with the plane of movement of the cutter wheels and solenoid-operated means for each snapping head to lift upwardly the snapping head against the glass sheet at a margin, the snapping assemblies further including moment heads mounted on the carriage and spaced transversely an equal distance from one another with the cutter wheels positioned equidistant between the moment heads whereby the sheet lifted by one of the snapping heads is abutted by an adjacent moment head on each side of the score line, and means to energize the solenoid-operated means of the snapping assemblies in sequence.

9. The apparatus of claim 8 wherein the means to energize the solenoid-operated means of the snapping assemblies in sequence includes solenoids each connected to one of the solenoid-operated means for the snapping heads, a third level of said stepping switch means, said third level having a wiper and a bank of contacts with each contact of the bank being connected to one of the solenoids, connected to the solenoid-operated means for raising the snapping heads, in the same order in which the contacts of the first bank of contacts are connected to the means to energize the first bank, means operated by the second relay to energize the wiper of the third level during part only of the deenergization of the second relay whereby only snapping heads below score lines are raised and their raising is in sequence.

10. The apparatus of claim 9 and further including means operated by the sprocket drive means to return to their home position the wipers stepped off the banks of contacts.

11. The apparatus of claim 10 and further including means mounted on the supporting structure between the table sections to lift the glass sheet from the table sections to a raised position, a pair of means mounted on the carriage to push the sheet in the raised position, said pair of pusher means being mounted for pivotal movement about a horizontal axis and for horizontal movement relative to said carriage, a pair of means mounted on the supporting structure to stop movement of the raised glass sheet by said pusher means, said pair of stop means being mounted for movement between raised and lowered positions and in the raised position aligning the abutting edge of the glass sheet in a vertical plane normal to the direction of movement of the carriage, and means actuated by the relative horizontal movement of the pusher means in a direction opposite to the movement of the carriage from the first position to the second position to rotate the pusher about its axis for movement above the sheet, to lower the sheet-lifting means between the table sections and to lower the pair of stop means.

12. The apparatus of claim 11 and further including clamping arms pivotally mounted on the supporting structure, means actuated by said relative movement of the pusher means to lower the arms onto the sheet at transverse margins, and means actuated by the carriage at the second position to raise the arms.

13. The apparatus of claim 11 and further including belts to move the sheet onto and off the table sections in a horizontal direction, said belts having a top run on the table sections, conveyor means to feed the sheet onto the belts, motor means to drive said belts including a motor, in series a coil for the motor and a normally closed contact of the on delay type and means to rapidly brake the motor upon deenergization of the coil of the motor means, a limit switch positioned adjacent the table for operation by the sheet on the conveyor means and having normally closed and open contacts, and a relay having a coil in series with the normally open contact of the limit switch, a holding circuit and a normally open contact in series with the time delay relay and the normally closed contact of the limit switch, whereby the motor means is stopped a set interval of time after the trailing edge of the sheet leaves the limit switch.

14. The apparatus of claim 13 wherein the carriage-moving means operates at fast and slow speeds and further including means initiated after a delay by the deenergization of the coil for the motor to operate the carriage moving means for fast speed movement of the carriage from the first position, glass-sheet-sensing means mounted on the carriage to change the carriage moving means to slow speed for the movement of the sheet by the pusher means, and means initiated by the means between the table sections to lift the glass sheet, when said means is in its lowered position, to operate the carriage-moving means at fast speed during the movement of the cutter wheels across the sheet.

15. An apparatus to place a glass sheet with an edge of the sheet at a predetermined position which comprises a conveyor means to move the sheet, a motor means to drive the conveyor means, said motor means including a motor, in series a coil for the motor and a normally closed contact and means to rapidly brake the motor upon deenergization of the coil, a time delay relay, a limit switch positioned for operation by the sheet moving on the conveyor means and having normally closed and open contacts, and a relay having a coil in series with the normally open contact of the limit switch, a holding circuit and a normally open contact in series with the time delay relay and the normally closed contact of the limit switch, said normally closed contact in series with the coil for the motor being opened through energization of said time delay relay.

16. An apparatus for cutting a glass sheet which comprises a table to support the sheet, said table having a top surface with longitudinal sections spaced transversely from adjacent longitudinal sections, a carriage, means to move the carriage across the table and between first and second positions, glass cutter wheels equally spaced and mounted on the carriage, solenoid-operated means for each cutter wheel to provide downward movement of the wheel to a position for providing by said wheels score lines across the sheet with movement of the carriage toward the second position, solenoids, each solenoid operatively connected to one of said solenoid-operated means, means to raise each cutter wheel after providing said score line, chains having pad supports mounted on a portion only of each chain, means to drive the chains, means to move the top run of the chains in a cyclic path to raise the pad supports in the top run above the top surface of the table and to move longitudinally the pad supports in the top run, a commutator switch having a brush and a commutator bar with equally spaced segments, means operated by the chain drive means to move said brush around said commutator bar, means to energize a number of said solenoids and connect for energization a number of the segments of the bar in the same pattern, means energized and deenergized by said switch to control operation of said chain drive means, means to momentarily electrically disconnect the commutator bar during part of the operation of the means for moving the top run of the chains in a cyclic path.

17. The apparatus of claim 16 and further including first and second stepping switches each having a first, second, third and fourth levels of co-rotatable wipers and banks of contacts, the first stepping switch having a fifth level with a bank of contacts and a wiper co-rotatable with the other wipers of that switch, each said switches at its home position having the first and second wipers one step from a first contact of the first and second banks, third and fourth wipers being positioned to be stepped onto the third and fourth banks when the first and second wipers step off the first and second banks, and at the home position with the fifth wiper on a last contact of the fifth bank of the first stepping switch, means to deenergize contacts of the first and third banks of both stepping switches in the same order as the energization of the first solenoids and to deenergize contacts of the second and fourth banks of both stepping switches in that order, the fifth wiper of the first stepping switch being energized, the first and third wipers being connected through an interrupter contact to a coil of the first stepping switch, the first and third wipers of the second stepping switch being connected through an interrupter contact to a coil of the second stepping switch, the second and fourth wipers of both stepping switches being connected to a coil of a relay, the last contact of the fifth bank being connected to the interrupter contact of the first stepping switch through a normally open contact, means operated by the carriage in the second position to close the normally open contact, a first contact of the fifth bank of contacts of the first stepping switch also being connected through the interrupter contact to the coil relay of the second stepping switch, means operated by deenergization of the coil connected to the second and fourth wipers of the stepping switches to operate the means to move the top run of the chains in a cyclic path, whereby the pad supports are operated to space glass sheets in a program determined by the operation of the solenoids for the cutter wheels, means to operate one of the stepping switches momentarily for movement of one of the first and second wipers from a nonenergized bank contact, and means to prevent operation of one of the stepping switches during operation of the other stepping switch.

18. The apparatus of claim 17 and further including a supporting structure, snapping assemblies to snap the sheet along the score lines, each of said snapping assemblies including a snapping head mounted on the supporting structure, said snapping head being equally spaced from one another and in alignment with the plane of movement of the cutter wheels, and solenoid-operated means for each snapping head to lift upwardly the snapping head against the glass sheet at a margin, the snapping assemblies further including moment heads mounted on the carriage and spaced transversely an equal distance from one another with the cutter wheels positioned between the moment heads whereby the sheet lifted by one of the snapping heads is abutted by an adjacent moment head on each side of the score line, solenoids to energize the solenoid operated means of the snapping assemblies, sixth and seventh levels of wipers and banks of contacts for each of said stepping switches, said sixth and seventh banks being connected to said solenoids for operation of the snapping assemblies in the same order in which the first and third banks of both stepping switches are connected to means for their energization, the sixth and seventh wipers being co-rotatable with the first through fifth wipers of the corresponding stepping switches and in their home position the sixth wiper being positioned as the first wiper and the seventh wiper being positioned as the third wiper, and means to energize said sixth and seventh wipers with deenergization of the coil of the relay connected to the second and fourth wipers of the stepping switches, whereby the proper snapping heads are raised in sequence for snapping the glass along the score lines.

19. An apparatus for cutting a glass sheet which comprises a supporting structure, a table to support the sheet, a carriage mounted on the supporting structure, means to move the carriage across the table and between first and second positions, a top surface on said table curved convexly about an axis in parallel with the direction of travel of said carriage, glass cutter means mounted on the carriage to provide parallel score lines on the sheet by movement of the carriage across the sheet, actuating means responsive to the carriage in the second position, snapping assemblies to snap the sheet along the score lines, each of said snapping assemblies including a snapping head mounted on the supporting structure adjacent an edge of said table, a pair of moment heads mounted on the carriage and means to lift upwardly the snapping head against the glass sheet at a margin and directly below the score line whereby the sheet is lifted against the moment heads of the snapping assembly, means initiated by the actuating means to operate said lifting means in sequence whereby to operate said snapping assemblies in sequence, and spacing means to sequentially lift and move each severed portion of the glass sheet from the remainder of said sheet in sequence with the snapping of the score lines by the snapping assemblies so as to space each severed portion from the others and from the remainder of said sheet.

References Cited in the file of this patent

UNITED STATES PATENTS

| | | |
|---|---|---|
| 1,710,898 | Rowley | Apr. 30, 1929 |
| 1,836,365 | Drake | Dec. 15, 1931 |
| 1,946,356 | Owen | Feb. 6, 1934 |
| 2,236,011 | Shock | Mar. 25, 1941 |
| 2,265,028 | De Croce | Dec. 2, 1941 |
| 2,568,816 | Marus | Sept. 25, 1951 |
| 2,806,553 | Eames | Sept. 17, 1957 |
| 2,834,156 | Oberlin | May 13, 1958 |
| 2,932,365 | Hornung | Apr. 12, 1960 |
| 2,948,991 | Walters et al. | Aug. 16, 1960 |